United States Patent [19]
Turtle et al.

[11] Patent Number: 5,488,725
[45] Date of Patent: Jan. 30, 1996

[54] SYSTEM OF DOCUMENT REPRESENTATION RETRIEVAL BY SUCCESSIVE ITERATED PROBABILITY SAMPLING

[75] Inventors: Howard R. Turtle, Rosemount; Gerald J. Morton, South St. Paul; F. Kinley Larntz, Shoreview, all of Minn.

[73] Assignee: West Publishing Company, Eagan, Minn.

[21] Appl. No.: 39,757

[22] Filed: Mar. 30, 1993

Related U.S. Application Data

[63] Continuation-in-part of Ser. No. 773,101, Oct. 8, 1991, Pat. No. 5,265,065.
[51] Int. Cl.$^6$ .................................................. G06F 17/30
[52] U.S. Cl. .............. 395/600; 364/419.19; 364/DIG. 1; 364/282.1; 364/282.3
[58] Field of Search ......................... 395/600; 364/419.19

[56] References Cited

U.S. PATENT DOCUMENTS

| | | | |
|---|---|---|---|
| 4,384,329 | 5/1983 | Rosenbaum et al. | 364/300 |
| 4,422,158 | 12/1983 | Galie | 395/400 |
| 4,554,631 | 11/1985 | Reddington | 364/283.2 |
| 4,843,389 | 6/1989 | Lisle et al. | 341/106 |
| 4,870,568 | 9/1989 | Kahle et al. | 395/600 |
| 5,109,509 | 4/1992 | Katayama et al. | 395/600 |
| 5,159,667 | 10/1992 | Borrey et al. | 395/148 |
| 5,220,625 | 6/1993 | Hatakeyama et al. | 382/54 |
| 5,263,159 | 11/1993 | Mitsui | 395/600 |
| 5,265,065 | 11/1993 | Turtle | 395/600 |
| 5,278,980 | 1/1994 | Pedersen et al. | 395/600 |
| 5,297,042 | 3/1994 | Morita | 364/419.19 |
| 5,301,109 | 4/1994 | Landauer et al. | 364/419.19 |
| 5,321,833 | 6/1994 | Chang et al. | 395/600 |
| 5,325,298 | 6/1994 | Gallant | 364/419.19 |
| 5,335,345 | 8/1994 | Frieder et al. | 395/600 |
| 5,418,948 | 5/1995 | Turtle | 395/600 |

OTHER PUBLICATIONS

M. E. Smith, "Aspects of the P–Norm Model of Information Retrieval: Syntactic Query Generation, Efficiency, and Theoretical Properties" Ph. D Thesis, Department of Computer Science, Cornell University, Ithaca, NY., TR 90–1128 (May, 1990), pp. 116–120.

Buckley et al., "Optimization of Inverted Vector Searches", *Proceedings of the Association for Computing Machinery (SIGIR 85)*, 1985, pp. 97–110.

Turtle et al., "Uncertainty in Information Retrieval Systems", *Provisional Proceedings on Uncertainty Management in Information Systems*, sponsored by the National Science Foundation and ESPIRIT, Majorca, Spain, Sep. 23, 1992, pp. 111–137.

Croft et al, "A Retrieval Model Incorporating Hypertext Links", *Hypertex '89 Proceedings*, Association for Computer Machinery, pp. 213–224 (Nov 1989).

Turtle et al, "Inference Networks for Document Retrieval", (List continued on next page.)

*Primary Examiner*—Thomas G. Black
*Assistant Examiner*—Wayne Amsbury
*Attorney, Agent, or Firm*—Kinney & Lange

[57] ABSTRACT

An information retrieval system based on probabilities that documents meet information needs. The frequency of occurrence of a representation in a collection of documents is estimated by identifying the frequency of occurrence of the representation in a sample of documents and calculating the difference between the maximum and minimum probable frequencies of occurrence of the representation in the collection. If the difference does not exceed a limit, a midpoint of the maximum and minimum probable frequencies is the estimated frequency of occurrence of the representation.

Document distribution probabilities are optimized and probability thresholds are established for the identification of documents. An initial probability threshold is established and is adjusted as the probabilities are scored for documents in samples. The document result list is iteratively adjusted through the samples.

46 Claims, 13 Drawing Sheets

OTHER PUBLICATIONS

*COINS* Technical Report 90–07, *University of Massachusetts* (Mar. 1990).

Turtle et al, "Inference Network for Document Retrieval", *SIGIR 90*, Association for Computing Machinery, pp. 1–24 (Sep. 1990).

Turtle, "Inference Network for Document Retrieval", Ph.D. Dissertation, *COINS Technical Report 90–92*, University of Massachusetts (Oct. 1990).

Turtle et al, "Efficient Probabilistic Inference for Text Retrieval", *RIAO '91 Conference Proceedings*, Recherche d'Informaion Assistée par Ordinateur, Universitat Autónoma de Barcelona, Spain, pp. 644–661 (Apr. 1991).

Turtle et al., "Evaluation of an Inference Network–Based Retrieval Model", *Transactions on Information Systems*, Association for Computer Machinery, vol. 9, No. 3. pp. 187–223 (Jul. 1991).

Croft et al., "Interactive Retrieval of Complex Documents", *Information Processing and Management*, vol. 26, No. 5. pp. 593–613 (1990).

Haynes, "Designing a System for the Specialized User: A Case Study", *Proceedings—1985 National Online Meeting*, Learning Information Inc., pp. 205–213, Apr. 30, 1985.

Croft et al., "The Use of Phrases and Structured Queries in Information Retrieval", *SIGIR 91*, Association for Computing Machinery, pp. 1–23 (Oct. 13, 1991).

Turtle et al., "A Comparison of Text Retrieval Models", *The Computer Journal*, vol. 35, No. 3, pp. 279–290 (1992).

Croft et al., "Retrieval of Complex Objects", *Proceedings of the International Conference on Extending Database Technology*, pp. 217–229 (Mar. 1992).

Croft et al., "Text Retrieval and Inference", *Text Based Intelligent Systems*, pp. 127–155 (1992).

Croft et al., "A Loosely–Coupled Integration of a Text Retrieval System and an Object–Oriented Database System", *SIGIR 92*, Association for Computing Machinery, pp. 223–232 (1992).

Porter, "An Algorithm for Suffix Skipping", *Program*, vol. 15, pp. 130–137 (1980).

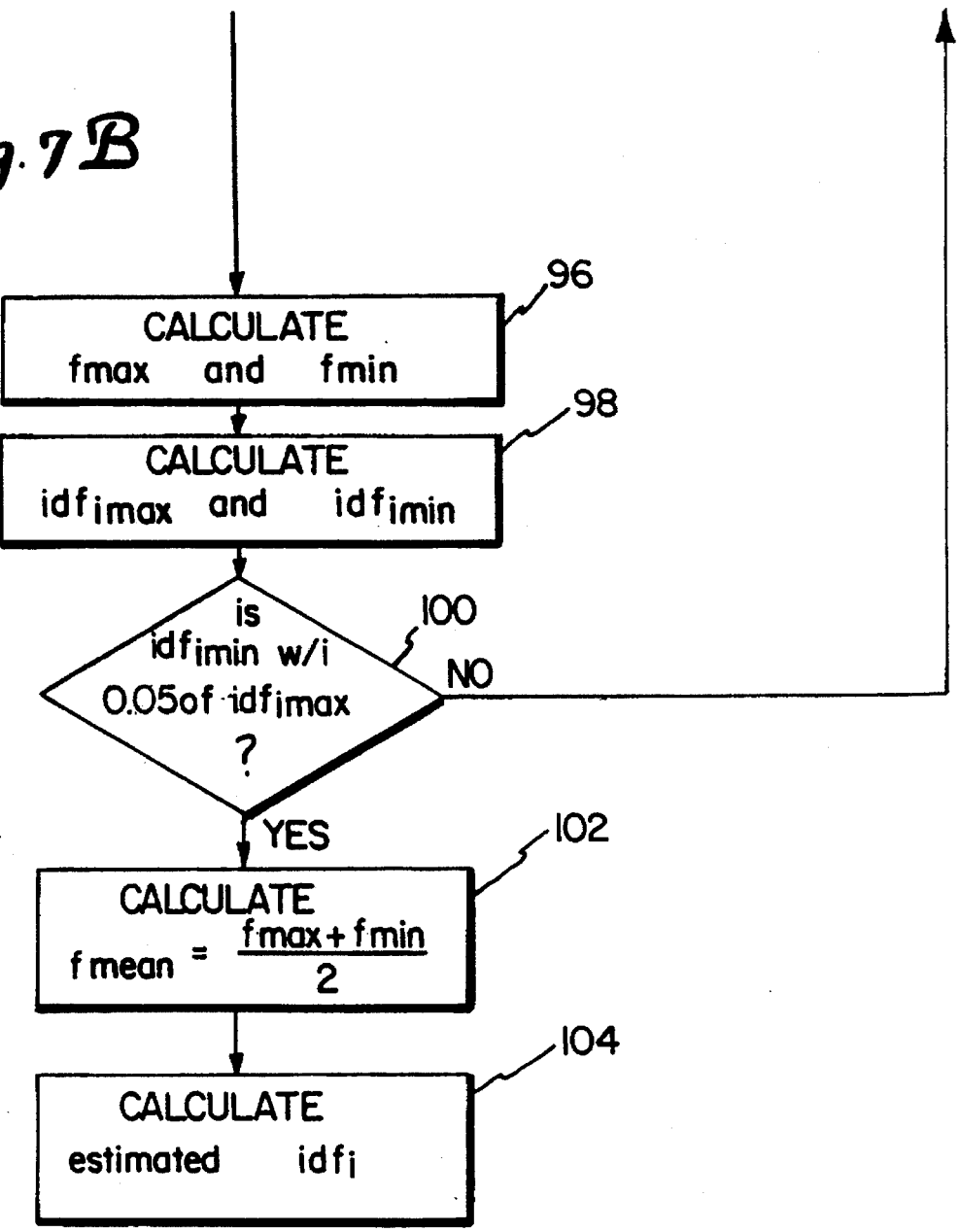

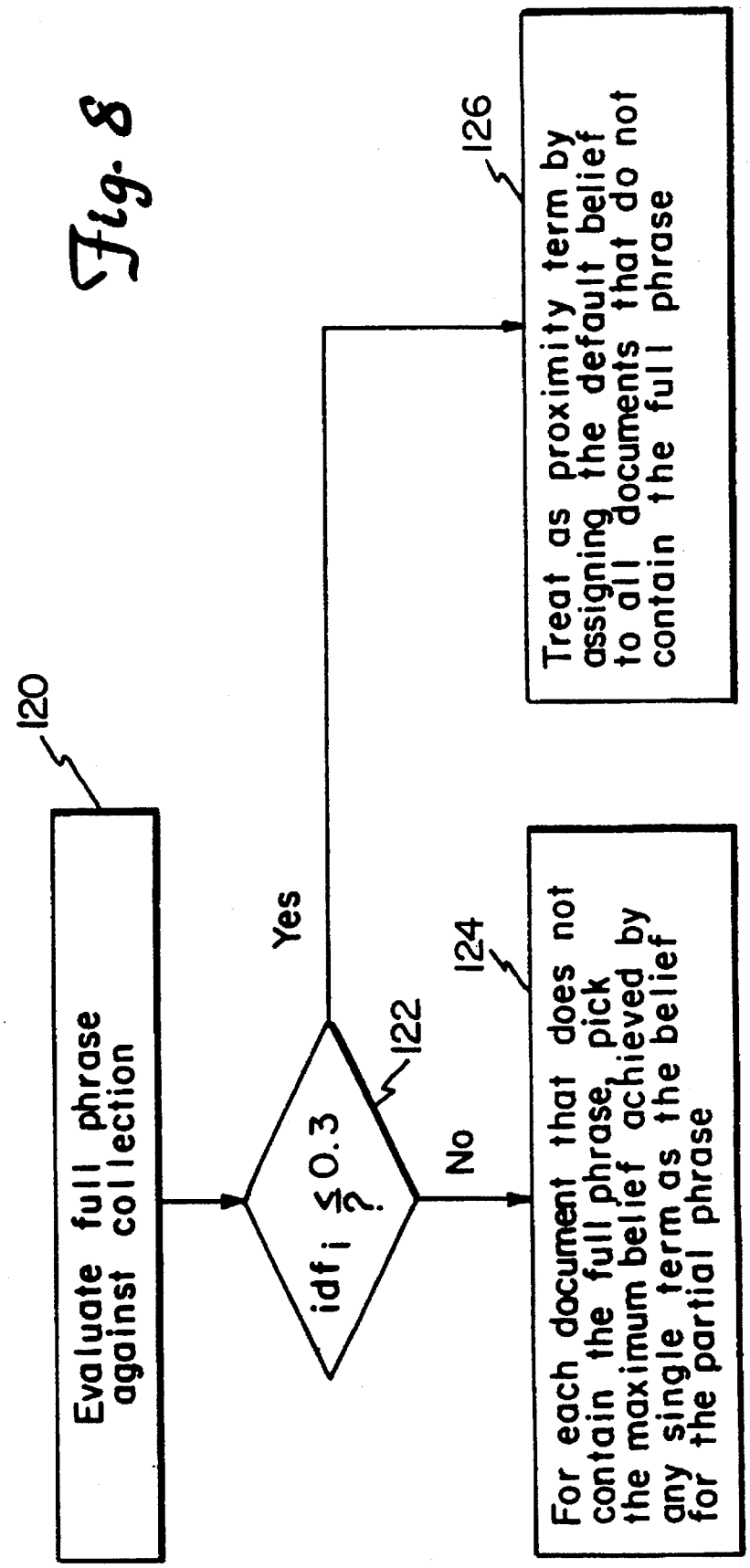

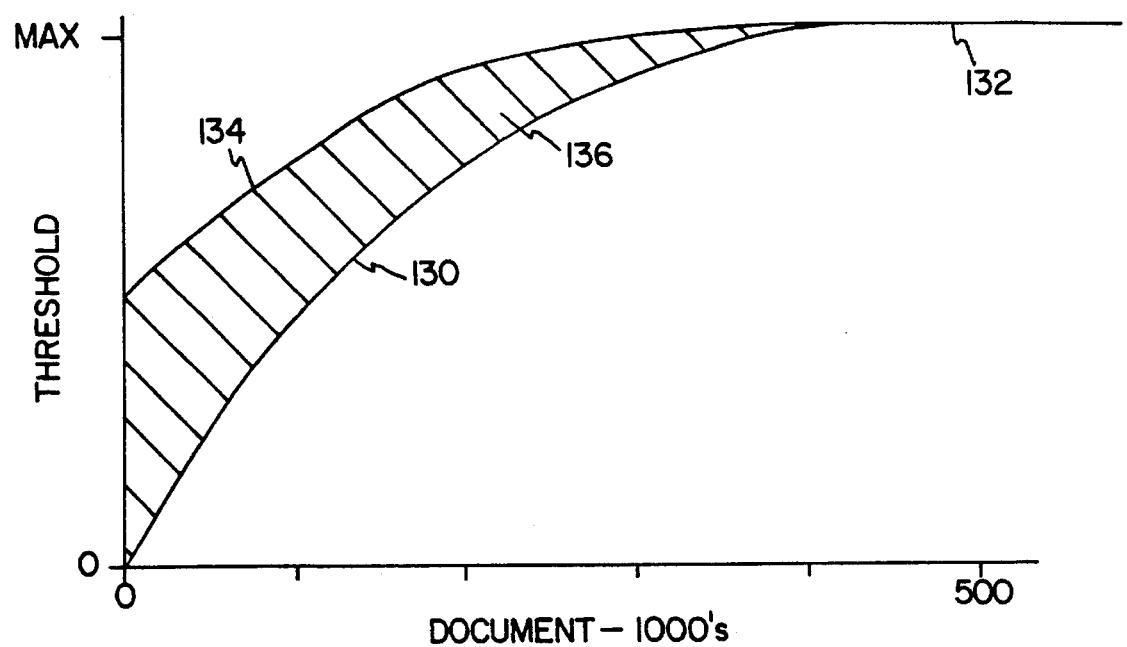

SYSTEM OF DOCUMENT REPRESENTATION RETRIEVAL BY SUCCESSIVE ITERATED PROBABILITY SAMPLING

CROSS REFERENCE TO RELATED APPLICATIONS

This application is a continuation-in-part of application Ser. No. 07/773,101 filed Oct. 8, 1991, U.S. Pat. No. 5,265,065.

BACKGROUND OF THE INVENTION

This invention relates to information retrieval, and particularly to document retrieval from a computer database using probability techniques. More particularly, the invention concerns a method and apparatus for establishing probability thresholds in probabilistic information retrieval systems and for estimating representation frequencies in document databases for representations having no pre-computed frequency.

There are, in theory, two categories of information retrieval systems: algebraic systems and probabilistic systems. Algebraic systems logically match terms and their positions in a stored information (such as a document) to terms in a query; Boolean systems are examples of algebraic systems. Probabilistic systems match representations (concepts) in a stored information to concepts in a query to retrieve information based on probabilities rather than algebraic or Boolean logic.

Presently, document retrieval is most commonly performed through use of Boolean search queries to search the texts of documents in the database. These retrieval systems specify strategies for evaluating documents with respect to a given query by logically comparing search queries to document texts. One of the problems associated with text searching is that for a single natural language description of an information need, different Boolean researchers will formulate different Boolean queries to represent that need. Because the queries are different, different documents will be retrieved for each search.

Another difficulty with Boolean systems is that all documents meeting the query are retrieved, regardless of number. If an unmanageable number of documents are retrieved, the searcher must reformulate the search query to more narrowly define the information need, thereby narrowing the retrieved documents to a more manageable number. However, in narrowing the search, the researcher risks missing relevant documents partially meeting the information need. Moreover, Boolean systems will not retrieve documents only partially meeting the query, which themselves are often important secondary documents to the query.

More recently, probabilistic systems employing hypertext databases have been developed which emphasize flexible organizations of multimedia "nodes" through connections made with user-specified links and interfaces which facilitate browsing in the network. Early networks employed query-based retrieval strategies to form a ranked list of candidate "starting points" for hypertext browsing. Some systems employed feedback during browsing to modify the initial query and to locate additional starting points. Network structures employing hypertext databases have used automatically and manually generated links between documents and the concepts or terms that are used to represent their content. For example, "document clustering" employs links between documents that are automatically generated by comparing similarities of content. Another technique is "citations" wherein documents are linked by comparing similar citations in them. "Term clustering" and "manually-generated thesauri" provide links between terms, but these have not been altogether suitable for document searching on a reliable basis.

Deductive databases have been developed employing facts about the nodes, and current links between the nodes. A simple query in a deductive database, where N is the only free variable in formula W, is of the form $\{N|W(N)\}$, which is read as "Retrieve all nodes N such that W(N) can be shown to be true in the current database." However, deductive databases have not been successful in information retrieval. Particularly, uncertainty associated with natural language affects the deductive database, including the facts, the rules, and the query. For example, a specific concept may not be an accurate description of a particular node; some rules may be more certain than others; and some parts of a query may be more important than others. For a more complete description of deductive databases, see Croft et al. "A Retrieval Model for Incorporating Hypertext Links", Hypertext '89 Proceedings, pp 213–224, November 1989 (Association for Computing Machinery), incorporated herein by reference.

A Bayesian network is a probabilistic network which employs nodes to represent the document and the query. If a proposition represented by a parent node directly implies the proposition represented by a child node, an implication line is drawn between the two nodes. If-then rules of Bayesian networks are interpreted as conditional probabilities. Thus, a rule A→B is interpreted as a probability $P(B|A)$, and the line connecting A with B is logically labeled with a matrix that specifies $P(B|A)$ for all possible combinations of values of the two nodes. The set of matrices pointing to a node characterizes the dependence relationship between that node and the nodes representing propositions naming it as a consequence. For a given set of prior probabilities for roots of the network, the compiled network is used to compute the probability or degree of belief associated with the remaining nodes.

An inference network is one which is based on a plausible or non-deductive inference. One such network employs a Bayesian network, described by Turtle et al. in "Inference Networks for Document Retrieval" SIGIR 90, pp. 1–24 Sep. 1990 (Association for Computing Machinery), incorporated herein by reference. The Bayesian inference network described in the Turtle et al. article comprises a document network and a query network. The document network represents the document collection and employs document nodes, text representation nodes and content representation nodes. A document node corresponds to abstract documents rather than their specific representations, whereas a text representation node corresponds to a specific text representation of the document. A set of content representation nodes corresponds to a single representation technique which has been applied to the documents of the database.

The query network of the Bayesian inference network described in the Turtle et al. article employs an information node identifying the information need, and a plurality of concept nodes corresponding to the concepts that express that information need. A plurality of intermediate query nodes may also be employed where multiple queries are used to express the information requirement.

The Bayesian inference network described in the Turtle et al. article has been quite successful for small, general purpose databases. However, it has been difficult to formulate the query network to develop nodes which conform to the document network nodes. More particularly, the inference network described in the Turtle et al, article did not use domain-specific knowledge bases to recognize phrases, such as specialized, professional terms, like jargon traditionally associated with specific professions, such as law or medicine.

One important aspect to probabilistic retrieval networks, such as a Bayesian inference network, is the identification of the frequency of occurrence of a representation in each document and in the entire document collection. A representation that occurs frequently in a document is more likely to be a good descriptor of that document's content. A representation that occurs infrequently in the collection is more likely to be a good discriminator than one that occurs in many documents. Consequently, when creating a database for a probabilistic network, care is taken to identify the representations (content concepts) in the documents, as well as their frequencies. However, it is not always possible to identify certain representations (such as phrases, proximities and thesaurus or synonym classes) or their frequency when creating the database. More particularly, phrases are usually comprised of multiple words which themselves are individual concepts or representations. The concept or representation of a phrase might be different from the concepts or representations of the individual words forming the phrase. For example, the phrase "independent contractor" is a different concept than either of the constituent words "independent" and "contractor". Since it is not always possible to identify all possible phrases, or their frequency of occurrence, during creation of the database, the use of phrases as a matching term in probabilistic networks has not been altogether successful. Proximities (such as citations) and thesaurus and synonym classes have likewise not been successful identifiers because of the inability to identify all synonyms, proximities and thesaurus classes during creation of the database or to pre-assign their frequencies.

Techniques have been developed to identify phrases, synonyms, proximities and thesaurus classes as concepts in the query, and to find phrases, synonyms, proximities and thesaurus classes as representations in the documents. However, no satisfactory technique exists for identifying the frequencies of occurrence of representations in the documents and in the collection when the document collection is large and the frequencies of occurrence are not included in the database.

Another difficulty with probabilistic networks is that for large databases, for example databases containing about one-half million documents or more, the processing resources required to evaluate a query have been too great to be commercially feasible. More particularly, probabilistic networks required that all representations for all documents in the collection containing at least one query term must be examined against all of the concepts in the query. Hence, probabilistic networks required extensive computing resources. While such computing resources might be reasonable for small collections of documents, they were not for large databases. There is, accordingly, a need to improve the processing of probabilistic networks to more efficiently employ the processing resources.

For a more general discussion concerning inference networks, reference may be made to *Probabilistic Reasoning in Intelligent Systems: Networks of Plausible Inference* by J. Pearl, published by Morgan Kaufmann Publishers, Inc., San Mateo, Calif., 1988, and to *Probabilistic Reasoning in Expert Systems* by R. E. Neapolitan, John Wiley & Sons, New York, N.Y., 1990.

GLOSSARY

As used herein, the following alpha-numeric characters refer to the following terms:

| Character | Term |
|---|---|
| a, b, A, B | Term or word in a query or document. |
| $c_1, c_2, \ldots c_m$ | Root or concept node in query network. |
| $d_1, d_2, \ldots d_i$ | Document node in a document network. |
| D | Number of documents to be selected or identified to result list. |
| $f_i$ | Concept frequency in collection (frequency, or number, of documents in collection containing concept i). |
| $f_{ij}$ | Frequency of concept i in document j. |
| $f_{max}$ | Probable maximum frequency of documents in collection containing specific concept (maximum bound). |
| $f_{min}$ | Probable minimum frequency of documents in collection containing specific concept (minimum bound). |
| g | Number of documents in collection between documents containing a representation (gaps). |
| I | Information need in query network. |
| i | Concept (an item of an information need). |
| $idf_i$ | Inverse document frequency for concept i. |
| $idf_{imax}$ | Probable maximum inverse document frequency for concept i. |
| $idf_{min}$ | Probable minimum inverse document frequency for concept i. |
| j | Specific document ($d_j$). |
| max $f_j$ | The maximum frequency for any term occurring in document j. |
| $n_i$ | Number of documents in sample containing selected representation. |
| $n_c$ | Number of documents in collection. |
| $P_1, P_2, \ldots P_n$ | Parent nodes to child node Q. |
| $q_1, q_2, \ldots$ | Query nodes in query network. |
| Q | Child node to parent nodes P. |
| $r_1, r_2, \ldots r_k$ | Leaf or concept representation nodes in document network. |
| $s_i$ | A calculated number equal to greater of $x_i/n_i$ and sd. |
| sd | Standard deviation. |
| sq | Sum of squares of gaps g. |
| $t_1, t_2, \ldots t_j$ | Interior text nodes in document network. |
| $tf_{ij}$ | Probability estimate based on the frequency that concept i appears in document j (based on $f_{ij}$). |
| T | Number of terms in query. |
| V | Number of duplicate terms removed from query. |
| $w_1, w_2, \ldots w_n$ | Term weights for parent nodes where $w_g$ is maximum. |
| $w_g$ | Maximum term weight for child node Q, $0 \leq w_g \leq 1$. |
| $x_i$ | Number of documents in sample. |

-continued

| Character | Term |
|---|---|
| z | Standard critical value. |
| π | Parent Set ($P_1, P_2, \ldots P_n$) |

SUMMARY OF THE INVENTION

According to one aspect of the present invention the frequency of occurrence of a selected representation in a collection of documents is estimated by identifying the frequency of occurrence of the representation in a sample of documents selected from the collection. Probable maximum and probable minimum frequencies of occurrence of the representation in the entire collection are calculated, and the midpoint of the probable maximum and minimum frequencies is selected.

The estimated frequency of occurrence of the selected representation is set equal to the selected midpoint when the calculated difference between the probable maximum and minimum frequencies does not exceed a preselected limit. If the preselected limit is exceeded, the sample of documents is adjusted to include additional documents from the collection, the sampling and calculating being repeated until the calculated difference between the probable maximum and minimum frequencies is within the preselected limit.

The advantage provided by estimation of the frequency of representations such as phrases, synonyms, proximities and thesaurus classes is that the representations can be identified from the query itself and the frequencies can be accurately estimated without significantly affecting processing resources or the search results. Consequently, representations such as phrases, synonyms, proximities and thesaurus classes can be employed as representation concepts, even in large databases.

According to another aspect of the invention a sample is selected and the one document with the highest probability of meeting the information need defined by the query is identified from the sample of documents from the collection. In one form of the invention, a probability threshold is set equal to the probability that the selected document meets the information need. When a predetermined number of additional documents of the collection are identified as having a probability of meeting the information need which is greater than the probability threshold, the threshold is reset to the probability of the selected document with the lowest calculated probability. Thereafter, as documents with higher probabilities are identified, the documents with the lowest probabilities are correspondingly removed. Upon completion of the search, the predetermined number of documents identified as having the highest probabilities are retrieved, preferably in probability order.

In another form of the invention, instead of employing the probability of the document selected from the first sample as a probability threshold, successive samples are iteratively selected, each successive sample containing documents different from each previous sample. Up to a predetermined number of documents having the highest probabilities of meeting the information need are identified during each iteration, the documents being selected from a group consisting of the sample of documents selected for the respective iteration and the documents identified during the previous iteration. Preferably, the predetermined number is equal to the number of the respective iteration, so there are as many iterations as there are documents to be selected.

BRIEF DESCRIPTION OF THE DRAWINGS

FIGS. 7A and 7B, taken together, are a detailed flowchart identifying the steps for calculating the estimated inverse document frequency for a specific concept according to the present invention.

FIG. 8 is a flowchart illustrating the manner by which partial phrases are handled in a document retrieval system.

FIG. 9 is a graph illustrating the principles of certain aspects of threshold estimating according to the present invention.

DETAILED DESCRIPTION OF THE PREFERRED EMBODIMENT

The Probability Network

Inference probability networks employ a predictive probability scheme in which parent nodes provide support for their children. Thus, the degree to which belief exists in a proposition depends on the degree to which belief exists in the propositions which potentially caused it. This is distinct from a diagnostic probability scheme in which the children provide support for their parents, that is belief in the potential causes of a proposition increases with belief in the proposition. In either case, the propagation of probabilities through the network is done using information passed between adjacent nodes.

Figure 1:
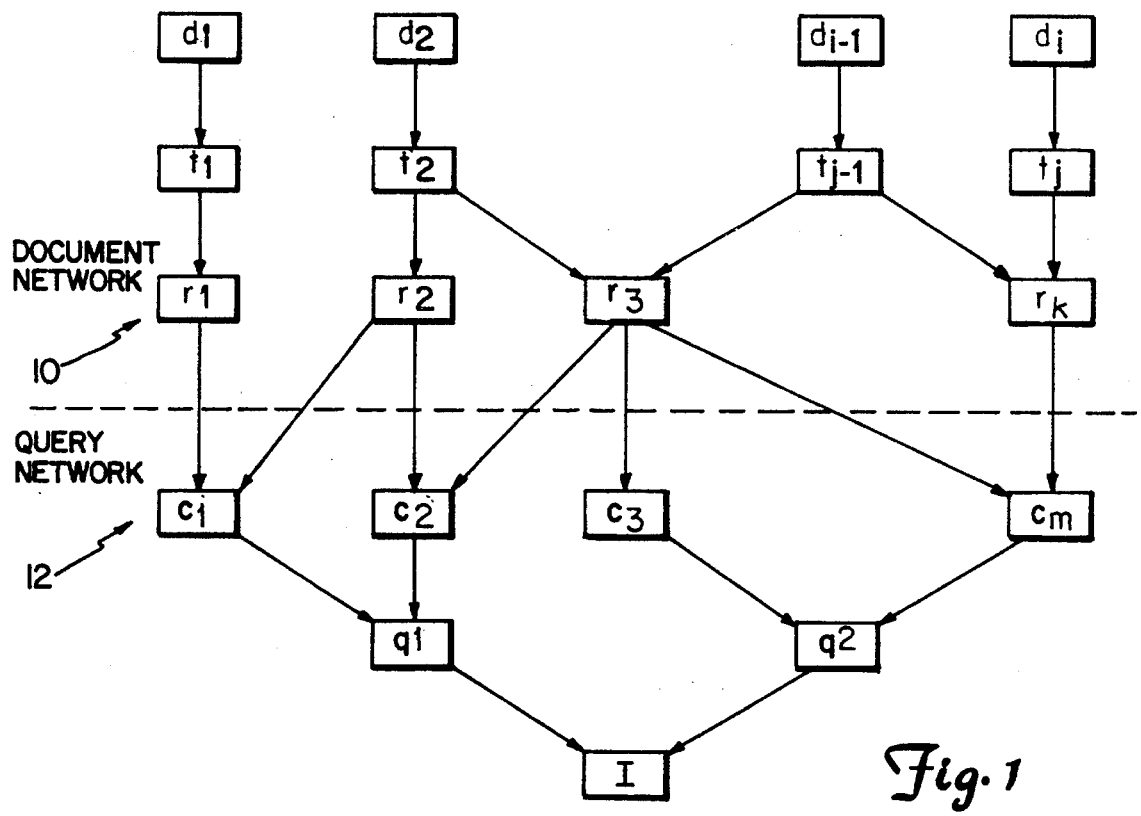
FIG. 1 is a block diagram representation of a Bayesian inference network with which the present invention is used.

FIG. 1 illustrates a Bayesian inference network as described in the aforementioned Turtle et al. article. The Bayesian network shown in FIG. 1 is a directed, acyclic dependency graph in which nodes represent propositional variables or constraints and the arcs represent dependence relations between propositions. An arc between nodes represents that the parent node "causes" or implies the proposition represented by the child node. The child node contains a link matrix or tensor which specifies the probability that the child node is caused by any combination of the parent nodes. Where a node has multiple parents, the link matrix specifies the dependence of that child node on the set of parents and characterizes the dependence relationship between the node and all nodes representing its potential causes. Thus, for all nodes there exists an estimate of the probability that the node takes on a value given any set of values for its parent nodes. If a node a has a set of parents $\pi a=\{p_1, \ldots p_n\}$, the estimated probabilities $P(a|p_1, \ldots p_n)$ are determined.

The inference network is graphically illustrated in FIG. 1 and consists of two component networks: a document network 10 and a query network 12. The document network consists of document nodes $d_1, d_2, \ldots d_{i-1}, d_i$, interior text representation nodes $t_1, t_2, \ldots t_{j-1}, t_j$, and leaf nodes $r_1, r_2, r_3, \ldots r_k$. The document nodes d correspond to abstract documents rather than their physical representations. The interior nodes t are text representation nodes which correspond to specific text representations within a document. The present invention will be described in connection with the text content of documents, but it is understood that the network can support document nodes with multiple children representing additional component types, such as audio, video, etc. Similarly, while a single text may be shared by more than one document, such as journal articles that appear in both serial issue and reprint collections, and parent/divisional patent specifications, the present invention shall be described in connection with a single text for each document. Therefore, for simplicity, the present invention shall assume a one-to-one correspondence between documents and texts.

The leaf nodes r are content representation nodes. There are several subsets of content representation nodes $r_1, r_2, r_3, \ldots r_k$, each corresponding to a single representation technique which has been applied to the document texts. If a document collection has been indexed employing automatic phrase extraction and manually assigned index terms, then the set of representation nodes will consist of distinct subsets or content representation types with disjoint domains. For example, if the phrase "independent contractor" has been extracted and "independent contractor" has been manually assigned as an index term, then two content representation nodes with distinct meanings will be created, one corresponding to the event that "independent contractor" has been automatically extracted from the subset of the collection, and the other corresponding to the event that "independent contractor" has been manually assigned to a subset of the collection. As will become clear hereinafter, some concept representation nodes may be created based on the content of the query network.

Each document node has a prior probability associated with it that describes the probability of observing that document. The document node probability will be equal to 1/(collection size) and will be small for most document collections. Each text node contains a specification of its dependence upon its parent. By assumption, this dependence is complete ($t_i$ is true) when its parent document is observed ($d_i$ is true). Each representation node contains a specification of the conditional probability associated with the node given its set of parent text nodes. The representation node incorporates the effect of any indexing weights (for example, term frequency in each parent text) or term weights (inverse document frequency) associated with the concept.

The query network 12 is an "inverted" directed acyclic graph with a single node I which corresponds to an information need. The root nodes $c_1, c_2, c_3, \ldots c_m$ are the primitive concept nodes used to express the information requirement. A query concept node, c, contains the specification of the probabilistic dependence of the query concept on its set of parent representation content nodes, r. The query concept nodes $c_1 \ldots c_m$ define the mapping between the concepts used to represent the document collection and the concepts that make up the queries. A single concept node may have more than one parent representation node. For example, concept node $c_2$ may represent the query concept "independent contractor" and have as its parents representation nodes $r_2$ and $r_3$ which correspond to "independent contractor" as a phrase and as a manually assigned term.

Nodes $q_1$, $q_2$ are query nodes representing distinct query representations corresponding to the event that the individual query representation is satisfied. Each query node contains a specification of the query on the query concept it contains. The intermediate query nodes are used in those cases where multiple query representations express the information need I.

Figure 2:
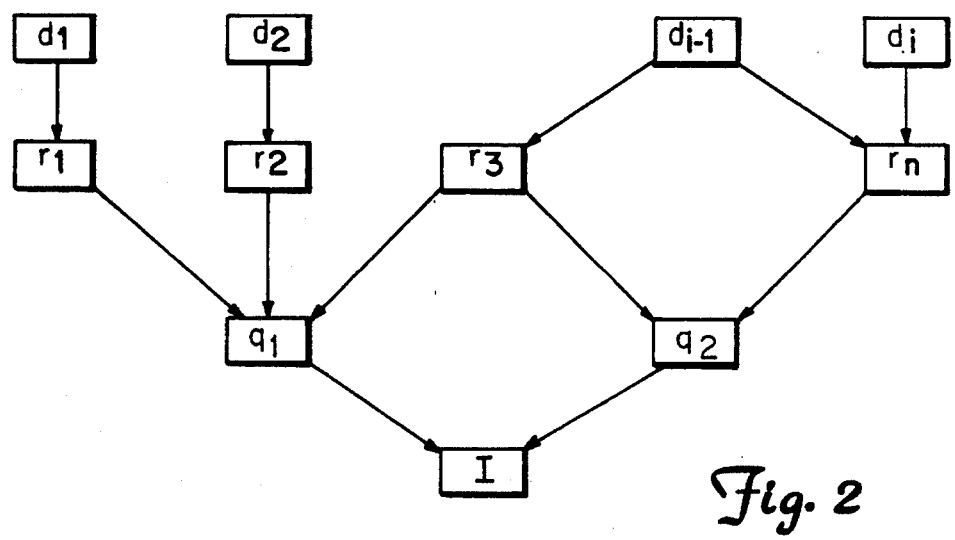
FIG. 2 is a block diagram representation of a simplified Bayesian inference network as in FIG. 1.

As shown in FIG. 1, there is a one-to-one correspondence between document nodes, d, and text nodes, t. Consequently, the network representation of FIG. 1 may be diagrammatically reduced so that the document nodes $d_1, d_2, \ldots d_{i-1}, d_i$ are parents to the representation nodes $r_1, r_2, r_3, \ldots r_k$. In practice, it is possible to further reduce the network of FIG. 1 due to an assumed one-to-one correspondence between the representation nodes $r_1, r_2, r_3, \ldots r_k$, and the concept nodes $c_1, c_2, c_3, \ldots C_m$. The simplified inference network is illustrated in FIG. 2 and is more particularly described in the article by Turtle et al., "Efficient Probabilistic Inference for Text Retrieval," RIAO 91 Conference Proceedings, pp. 644–661, April, 1991 (Recherche d'Informaion Assistée par Ordinateur, Universitat Autónoma de Barcelona, Spain), which article is herein incorporated by reference.

As described above, each child node carries a probability that the child node is caused by the parent node. The estimates of the dependence of a child node Q on its set of parents, $P_1, P_2, \ldots P_n$, are encoded using the following expressions:

$$bel_{or}(Q) = 1 - (1 - p_1) \cdot (1 - p_2) \cdot \ldots \cdot (1 - p_n) \quad \text{EQ 1}$$

$$bel_{and}(Q) = p_1 \cdot p_2 \cdot p_3 \cdot \ldots \cdot p_n \quad \text{EQ 2}$$

$$bel_{not}(Q) = 1 - p_1 \quad \text{EQ 3}$$

$$bel_{wtd-sum}(Q) = \frac{(w_1 p_1 + w_2 p_2 + \ldots + w_n p_n) w_g}{w_1 + w_2 + w_2 + \ldots w_n} \quad \text{EQ 4}$$

where $P(P_1=\text{true})=p_1$, $P(P_2=\text{true})=p_2, \ldots P(P_n=\text{true})=p_n$, $w_1, w_2, \ldots W_n$ are the term weights for each term $P_1, P_2, \ldots P^n$, and $w_g$ is the maximum probability that the child node can achieve, $0 \leq W_g \leq 1$.

As described above, all child nodes carry a probability that the child was caused by the identified parent nodes. The structure of document network 10 is not changed, except to add documents to the database. The document nodes d and text nodes t do not change for any given document once the document representation has been entered into document network 10. Most representation nodes are created with the database and are dependent on the document content. Some representation nodes (representing phrases and the like) are created for the particular search being conducted and are dependent on the search query.

Query network 12, on the other hand, changes for each input query defining a document request. Therefore, the concept nodes c of the search network are created with each search query and provide support to the query nodes q and the information need, node I (FIG. 1).

Document searching can be accomplished by a document-based scan or a concept-based scan. A document-based scan is one wherein the text of each document is scanned to determine the likelihood that the document meets the information need, I. More particularly, the representation nodes $r_1, r_2, r_3, \ldots r_k$ of a single document are evaluated with respect to the several query nodes $q_1, q_2$ to determine a probability that the document meets the information need. The top D-ranked documents are then selected as potential information need documents. The scan process reaches a point, for example after assigning a probability for more than D documents of a large document collection, that documents can be eliminated from the evaluation process after evaluating subsets of the representation nodes. More particularly, if a given document scores so low of a probability after only evaluating one or two representation nodes, determination can be made that even if the evaluation continued the document still would not score in the top D-ranked documents. Hence, most documents of a large collection are discarded from consideration without having all their representation nodes evaluated.

A concept-based scan is one wherein all documents containing a given representation node are evaluated. As the process continues through several representation nodes, a scorecard is maintained of the probabilities that each document meets the information need, I. More particularly, a single representation node $r_1$ is evaluated for each document in the collection to assign an initial probability that the document meets the concept. The process continues through the several representation nodes with the probabilities being updated with each iteration. The top D-ranked documents are then selected as potential information need documents. If at some point in the process it can be determined that evaluation of additional representation concepts will not alter the ranking of the top D-ranked documents, the scan process can be terminated.

It can be appreciated that the representation nodes $r_1, r_2, r_3, \ldots r_k$ are nodes dependent on the content of the texts of the documents in the collection. Most representation nodes are created in the document database. Other representation nodes, namely those associated with phrases, synonyms and citations, are not manifest in any static physical embodiment and are created based on each search query. Because the user can define phrases and thesaurus relationships when creating the query, it is not possible to define all combinations in a static physical embodiment. For example, a query manifesting the concept "employee" may be represented by one or more of "actor", "agent", "attendant", "craftsman", "doer", "laborer", "maid", "servant", "smith", "technician" and "worker", to name a few. These various representation nodes may be created from the query node at the time of the search, such as through the use of thesauri and other tools to be described, as well as through databases. A query node $q_1, q_2$, etc. can be manifest in one or more representations.

The Search Query

The present invention will be described in connection with a database for searching legal documents, but it is to be understood the concepts of the invention may be applied to databases for searching other types or classes of documents. The invention will be described in connection with a specific search query as follows:

"What is the liability of the United States under the Federal Tort Claims Act for injuries sustained by employees of an independent contractor working under contract with an agency of the United States government?"

Figure 3:
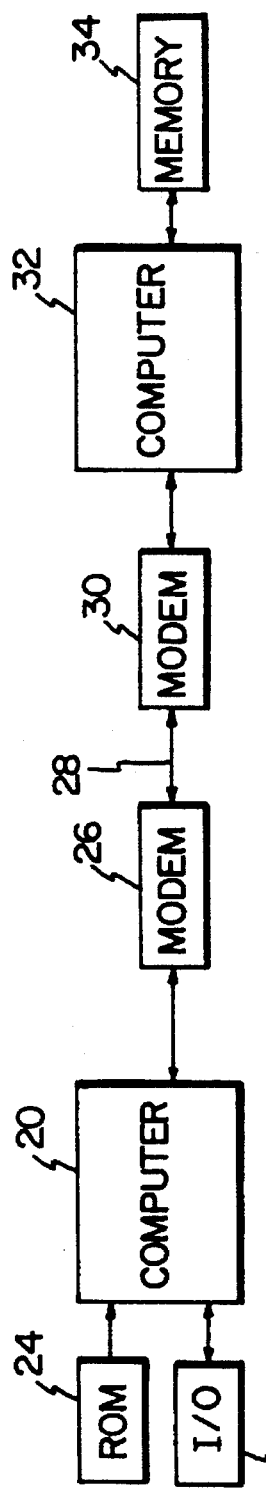
FIG. 3 is a block diagram of a computer system for carrying out the invention.
Figure 5:
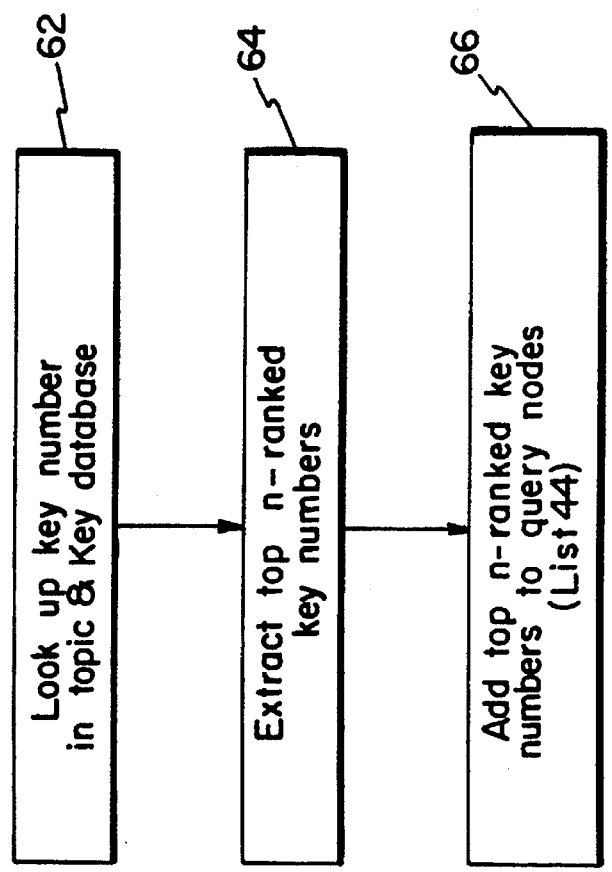
FIG. 5 is a flowchart and example of the steps for determining a key number for inclusion in the search query described in connection with FIG. 4.

The present invention is carried out through use of a computer system, such as illustrated in FIG. 3 comprising a computer 20 connected to an input/output terminal 22 and a read only memory (ROM) 24. ROM 24 may be any form of read only memory, such as a CD ROM, write protected magnetic disc or tape, or a ROM, PROM or EPROM chip encoded for the purposes described. Computer 20 may be a personal computer (PC) and may be optionally connected through modem 26, telephone communication network 28 and modem 30 to a central computer 32 having a memory 34. In one form of the invention, the document network 10 and the document database containing the texts of documents represented by the document network are contained in the central computer 32 and its associated memory 34. Alternatively, the entire network and database may be resident in the memory of personal computer 20 and ROM 24. In a legal database and document information retrieval network the documents may comprise, for example, decisions and orders of courts and government agencies, rules, statutes and other documents reflecting legal precedent. By maintaining the document database and document network at a central location, legal researchers may input documents into the document database in a uniform manner. Thus, there may be a plurality of computers 20, each having individual ROMs 24 and input/output devices 22, the computers 20 being linked to central computer 32 in a time-sharing mode. The search query is developed by each individual user or researcher and input via the respective input/output terminal 22. For example, input/output terminal 22 may comprise the input keyboard and display unit of PC computer 20 and may include a printer for printing the display and/or document texts.

ROM 24 contains a database containing phrases unique to the specific profession to which the documents being searched are related. In a legal search and retrieval system as described herein, the database on ROM 24 contains stemmed phrases from common legal sources such as *Black's* or *Statsky's Law Dictionary*, as well as common names for statutes, regulations and government agencies. ROM 24 may also contain a database of basic and extended stopwords comprising words of indefinite direction which may be ignored for purposes of developing the concept nodes of the search query. For example, basic stopwords included in the database on ROM 24 includes indefinite articles such as "a", "an", "the", etc. Extended stopwords include prepositions, such as "of", "under", "above", "for", "with", etc., indefinite verbs such as "is", "are", "be", etc. and indefinite adverbs such as "what", "why", "who", etc. The database on ROM 24 may also include a topic and key database such as the numerical keys associated with the well-known West Key Digest system.

Figure 4A:
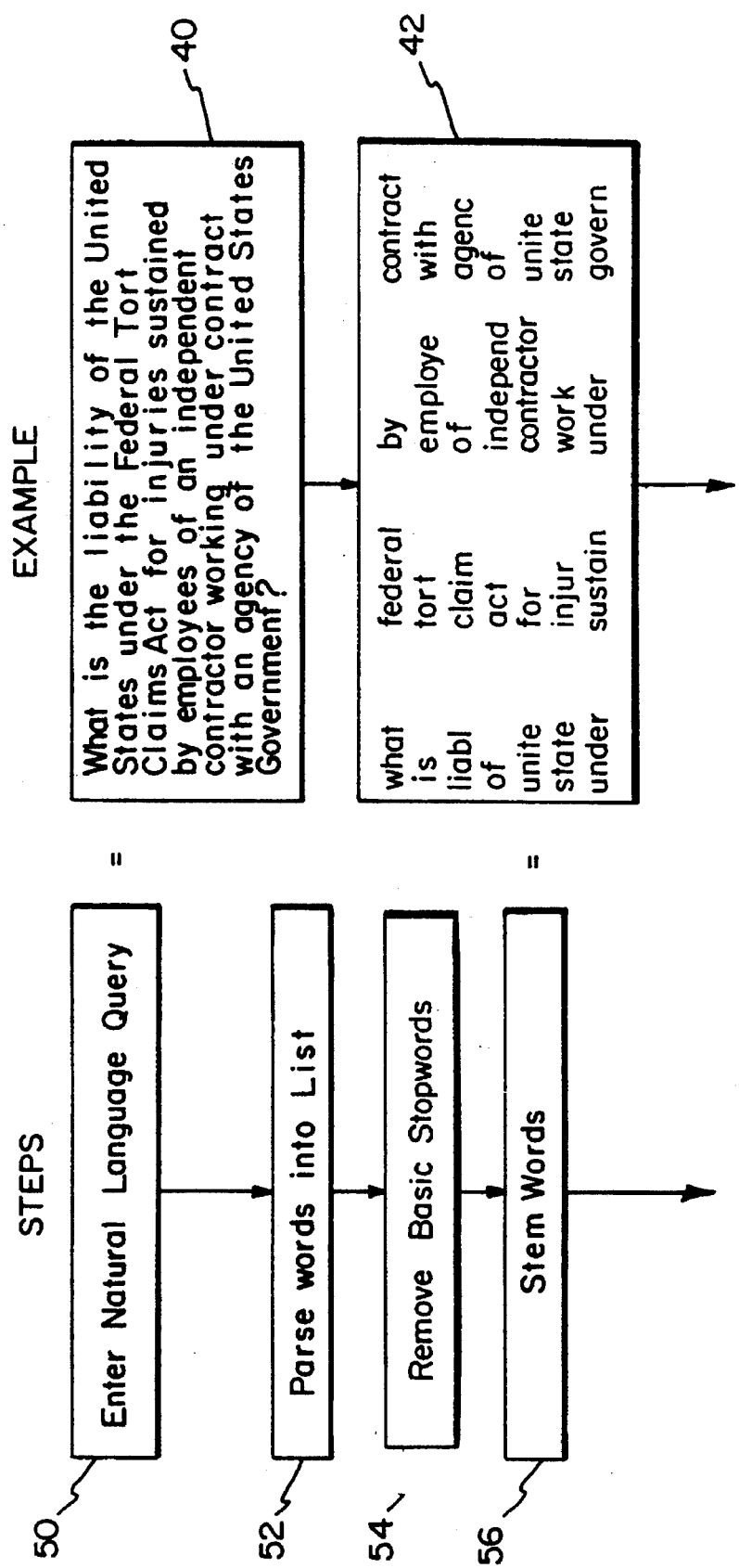
FIGS. 4A and 4B, taken together, are a flowchart and example illustrating the steps of creating a search query for a probabilistic network.
Figure 4B:
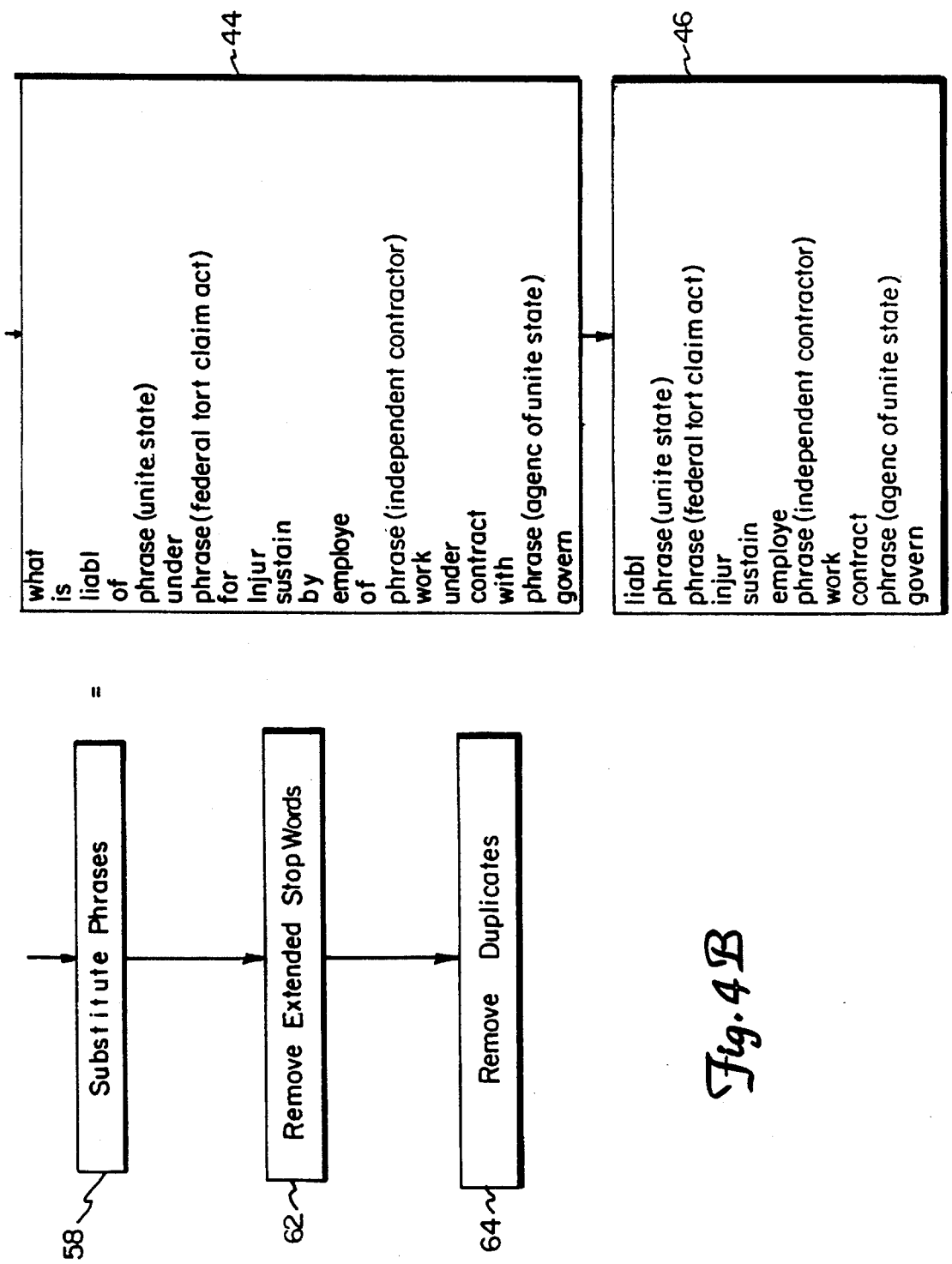

FIGS. 4A and 4B are a flow diagram illustrating the process steps and the operation on the example given above in the development of the concept nodes c. The natural language query is provided by input through input terminal 22 to computer 20. In the example shown in FIG. 4, the natural language input query is:

"What is the liability of the United States under the Federal Tort Claims Act for injuries sustained by employees of an independent contractor working under contract with an agency of the United States government? "

By way of example, a corresponding WESTLAW Boolean query might be:

"UNITED STATES" U.S. GOVERNMENT (FEDERAL /2 GOVERNMENT) /P TORT/2 CLAIM/P INJUR! /P EMPLOYEE WORKER CREWMAN CREWMEMBER /P INDEPENDENT/2 CONTRACTOR.

As shown in FIG. 4A, the natural language query shown in block 40 is inputted at step 50 to computer 20 via input/output terminal 22. The individual words of the natural language query are parsed into a list of words at step 50, and at step 54 each word is compared to the basic stopwords of the database in ROM 24. At step 54, the basic stopwords such as "the" are removed from the list. The extended stopwords are retained for phrase recognition and remaining extended stopwords will be removed after phrase recognition, described below.

At step 56, the remaining words are stemmed to reduce each word to its correct morphological root. One software routine for stemming the words is based on that described by Porter "An Algorithm for Suffix Stripping", Program, Vol. 14, pp 130–137 (1980). As a result of step 56 a list of words is developed as shown in block 42, the list comprising the stems of all words in the query, except the basic stopwords.

Phrases

Previous systems recognized linguistic structure (for example, phrases) by statistical or syntactic techniques. Phrases are recognized using statistical techniques based on the occurrence of phrases in the document collection itself; thus, proximity, co-occurrence, etc. were used. Phrases are recognized using syntactic techniques based on the word/ term structure and grammatical rules, rather than statistically. Thus, the phrase "independent contractor" could be recognized statistically by the proximity of the two words and the prior knowledge that the two words often appeared together in documents. The same term could be recognized syntactically by noting the adjective form "independent" and the noun form "contractor" and matching the words using noun phrase grammatical rules. (Manual selection systems have also been used wherein the researcher manually recognizes a phrase during input.)

Previous inference networks employed a two-term logical AND modeled as the product of the beliefs for the individual terms. Beliefs (probabilities) lie in the range between 0 and 1, with 0 representing certainty that the proposition is false and 1 representing certainty that the proposition is true. The belief assigned to a phrase is ordinarily lower than that assigned to either component term. However, experiments reveal that the presence of phrases represents a belief higher than the belief associated with either component term. Consequently, separately identifying phrases as independent representation nodes significantly increases the performance of the information retrieval system. However, single terms of an original query are retained because many of the concepts contained in the original query are not described by phrases. Experimentation has suggested that eliminating single terms significantly degrades retrieval performance even though not all single terms from an original query are required for effective retrieval.

As previously described, the phrase relationships in the search query are recognized by domain-knowledge based techniques (e.g., the phrase database), and by syntactic relationships. The primary reason to solely select syntactical and domain-based phrases for purposes of the query network is to reduce user involvement in identifying phrases for purposes of creating a query.

An example of a domain-knowledge database is a database containing phrases from a professional dictionary. This type of phrase handling is particularly suitable for professional information retrieval where specialized phrases are often employed.

At step 58 in FIG. 4B, computer 20 returns to the database in ROM 24 to determine the presence of phrases within the parsed and stemmed list 42. The phrase database in ROM 24 comprises professional, domain-specific phrases (such as from *Black's Law Dictionary*) which have been stemmed in accordance with the same procedure for stemming the words of a search query. Computer 20 compares the first and second words of list 42 to the database of phrases in ROM 24 to find any phrase having at least those two words as the first words of a phrase. Thus, comparing the first two terms "WHAT" and "IS" to the database of phrases (such as *Black's Law Dictionary*), no match is found. Thus, as shown in block 44, "WHAT" is retained for the search query. The next two words "IS" and "LIABL" are compared to the database of phrases and no phrase is found. When "UNITE" and "STATE" are compared to the database, a phrase match is found. The next word "FEDERAL" is then compared to the database to determine if it corresponds to the third word of any phrase commencing with "UNITE STATE". In this case no phrase is found, so both "UNITE" and "STATE" are removed from the list 44 and substituted with a phrase representing the term "UNITE STATE". When the terms "FEDERAL" and "TORT" are compared to the database a match is found to phrases in the database. The third and fourth words "CLAIM" and "ACT" also compare to at least one phrase commencing with "FEDERAL" and "TORT". Consequently, each of the terms "FEDERAL", "TORT", "CLAIM" and "ACT" are substituted with the phrase "FEDERAL TORT CLAIM ACT". (As explained below, if a word is found to be included in a successive phrases, the common word would be assigned to the longer phrase, if they have an unequal number of terms, or to the first phrase of the succession, if the number of terms in the phrases are equal.) The process continues to substitute phrases from the database for sequences of stemmed words from the parsed list 42, thereby deriving the list 44.

The phrase lookup is accomplished one word at a time. The current word and next word are concatenated and used as a key for the phrase database query. If a record with the key is found, the possible phrases stored under this key are compared to the next word(s) of the query. As each phrase is found, a record of the displacement and length of each found phrase is recorded.

The extended stopwords are included in the phrase matching technique because the phrases themselves contain such stopwords. For example, phrases like "doctrine of equivalents" and "tenancy at will" contain prepositions which are stopwords.

As indicated above, once successive terms have been identified as a phrase, the individual terms do not appear in the query shown at block 44 in FIG. 4B. In rare cases two phrases might seemingly overlap (i.e., share one or more of the same words). In such a case, the common word is not repeated for each phrase, but instead preference in the overlap is accorded to the longer phrase. For example, if a natural language search query contained ". . . tenancy at will, the power of which . . . ", the parsed and stemmed list (with basic stopwords removed) would appear as: "tenan", "at", "will", "power", "of", "which". The database could identify two possible phrases: "tenan at will" and "will power" with "will" in both phrases. As will be explained below, preference is accorded to the longest possible phrase, so the identified phrase will be "tenan at will".

With the phrases identified, as at 44, the remaining extended stopwords ("what", "is", "of", "under", "for", "by", "with") are removed at step 62, and any duplicate terms are removed at step 64, to be described in greater detail below. The result is the final query shown at block 46 in FIG. 4B.

Citations

Case citations, U.S. Code citations and citations to the Code of Federal Regulations (CFR) are handled as exact terms. Other citations, including subsection citations, are handled syntactically using word-level proximity as single terms or query nodes comprising numeric tokens. For example, a citation to Volume 78 Columbia Law Review page 1587 is encoded as 78 +4 1587 (meaning 78 within four words of 1587), and the citation to 17 U.S.C. 106A(e)(1) is encoded as 17+2 106A(e)(1). To encompass most citations, it is preferred to encode all citations as within five words. Hence, the above two citations will be encoded as 78+5 1587 and 17+5 106A(e) (1).

Hyphenations

Hyphenated terms in search queries are handled in much the same manner as citations. The hyphen is removed and the component words are searched using an adjacency operation which finds all adjacent occurrences of the component words.

Synonyms

Synonyms comprise equivalent words and misspellings and are created from a predefined database stored in ROM 24 (FIG. 3). Examples of equivalencies include 2d/2nd/second whereas examples of misspellings include habeas/habeus. Where a search query includes a word having a synonym, a new representation node r (FIG. 2) is created for each synonym. However, the weight associated with the node is based on the frequency of the entire class of nodes comprising all synonyms, rather than any one term of the class.

Duplicate terms

Where a single word, term or phrase occurs more than once in a query, the word, term or phrase is evaluated only once. After the word, term or phrase has been processed for phrase identification as heretofore described, the duplicate word, term or phrase is simply dropped from the search query. As will be explained hereinafter, the component probability score for each document containing a term duplicated in the query is multiplied by the query frequency, and the query normalization factor is increased by that frequency. Thus, the effect is that the duplicated term is evaluated multiple times as dictated by the query, but in a computationally simpler manner.

Thesaurus Classes

Thesauri are employed to identify words of similar or related meaning, as opposed to synonyms having identical meaning. The thesauri are used to suggest broader, narrower and related terms to the researcher for inclusion in the search query. These relationships can be drawn from the machine readable dictionaries (such as *Black's Law Dictionary*) encoded in databases, or from manually recorded domain knowledge.

Document Retrieval

One feature of probabilistic information retrieval systems is that the documents in the document collection are ranked in accordance with the probability that the document meets the information need identified in the query. This permits selection of a predetermined number of documents having the highest probabilities for identification and retrieval. For a given information need, for example, it may be desirable to retrieve 20 documents from a document collection of 500,000 documents. A probabilistic information retrieval network can identify for retrieval the 20 documents having the highest probability of meeting the information need.

Phrases, synonyms, proximities and thesaurus classes are not separately permanently identified in the document network. Instead, the representation nodes in the document network are created for the phrase, synonym, proximity or thesaurus class by those concept nodes (FIG. 1) which themselves are a function of the phrase or term in the query.

Figure 6A:
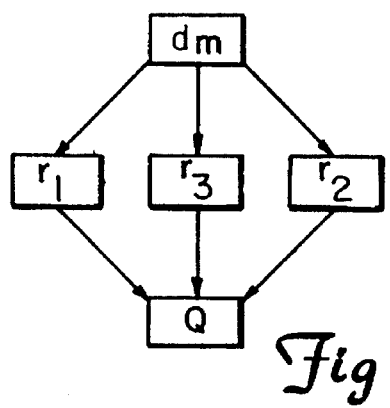
FIGS. 6A–6D are block diagram representations of illustrating different techniques for handling phrases.
Figure 6B:
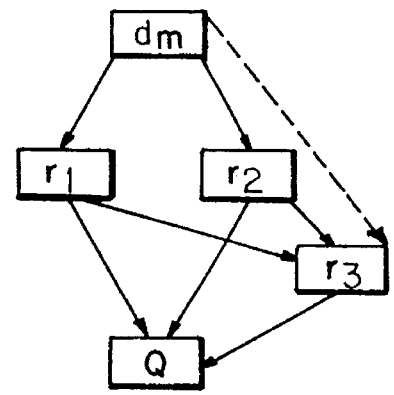
Figure 6C:
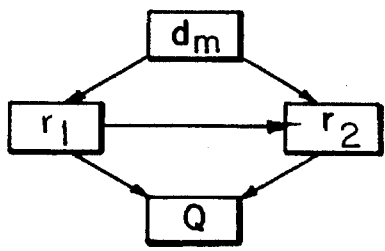
Figure 6D:
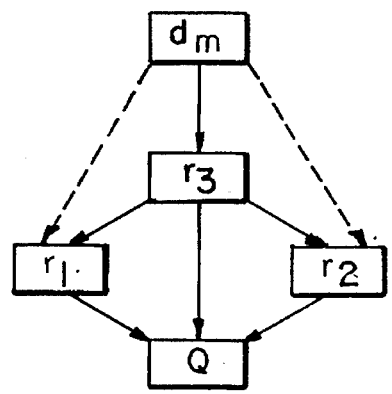

FIGS. 6A–6D illustrate different treatments of phrases in the document network of an inference network. Representation concepts $r_1$ and $r_2$ shown in FIGS. 6A–6D correspond to two words in the text of document $d_m$. Representation concept $r_3$ corresponds to the phrase in the text consisting of the two words. Q represents the query. For example, $r_1$ and $r_2$ may correspond to the occurrence of the terms "independent" and "contractor", respectively, while $r_3$ corresponds to the occurrence of the phrase "independent contractor". In the model illustrated in FIG. 6A (which is the preferred model), the phrase is treated as a separate representation concept, independent of the concepts corresponding to the component words. The belief in the phrase concept can be estimated using evidence about component words and the relationship between them, including linguistic relationships. The presence of the query phrase concept in the document increases the probability that the document satisfies the query (or information need). The model of FIG. 6B illustrates the case where the belief in the phrase concept depends on the belief in the concepts corresponding to the two component words. FIG. 6C illustrates a term dependence model where the phrase is not represented as a separate concept, but as a dependence between the concepts corresponding to the component words. A document that contains both words will more likely satisfy the query associated with the phrase due to the increase belief coming from the component words themselves. However, experimentation has revealed that the model of FIG. 6C is less appropriate for phrases and more appropriate for thesauri and synonyms. In FIG. 6D belief in the phrase concept is established from evidence from the document text itself, whereas belief in the concepts representing component words are derived from belief in the phrase itself. The model of FIG. 6D makes explicit the conditional dependence between the component concepts and addresses the practice of some authors that all component words of a phrase might not always be used in the text representation of a document. For the present purposes, it is preferred that document network 10 employ the phrase model of FIG. 6A so that the representation concepts for the phrases are independent of the corresponding words. Hence, a match between the concept node of a search query and the concept node of a documentation representation is more likely to occur where the search query contains only the phrase, and not the component words. It is understood that the other models (FIGS. 6B–6D) could be employed with varying results.

Thus far, there has been described techniques for obtaining lists containing single words, phrases, proximity terms (hyphenations and citations) and key numbers. These elements represent the basic concept nodes contained in the query. The phrases, hyphenations and citations create representation nodes of the document network. Computer 20 (FIG. 3) forwards the search query to computer 32, which determines the probability that a document containing some subset of these concepts matches the original query. For each single document, the individual concepts represented by each single word, phrase, proximity term, and key number of the query are treated as independent evidence of the probability that the document meets the information need, I. The probability for each concept is determined separately and combined with the other probabilities to form an overall probability estimate.

The probabilities for individual concepts are based on the frequency with which a concept occurs in document j ($tf_{ij}$) and the frequency ($f_i$) with which documents containing the concept (i) occur in the entire collection. The collection frequency may also be expressed as an inverse document frequency ($idf_i$). The inference network operates on two basic premises:

A concept that occurs frequently in a document (a large $tf_{ij}$) is more likely to be a good descriptor of that document's content, and A concept that occurs infrequently in the collection (a large $idf_i$) is more likely to be a good discriminator than a concept that occurs in many documents.

It can be shown that the probability, $P(c_i|d_j)$ that concept $c_i$ is a "correct" descriptor for document $d_j$ may be represented as $$P(c_i|d_j) = 0.4 + 0.6 \cdot idf_i \cdot tf_{ij}, \qquad \text{EQ 5}$$

where $$tf_{ij} = 0.5 + 0.5 \cdot \frac{\log(f_{ij}+1)}{\log \max f_j} \qquad \text{EQ 6}$$

and $$idf_i = \frac{\log \frac{n_c}{f_i}}{\log n_c} \qquad \text{EQ 7}$$

if $f_{ij}$ is less than max $f_j$, where $n_c$ is the number of documents in the collection, $f_{ij}$ is the frequency of concept i in document j, $f_i$ is the frequency of documents in the collection containing term i (i.e., the number of documents in which term i occurs), and max $f_j$ is the maximum frequency for any term occurring in document j. If $f_{ij}$ is not less than max $f_j$, then $tf_{ij}$ is set to 1.

Most document networks for search and retrieval are represented by a word index containing words from the documents to be matched to query terms. In Boolean networks, relationships were determined from the word index and offset data therein to locate documents meeting the logical criteria of the query. The present invention employs a probabilistic network in which the same database and word index may be employed to calculate the probabilities set forth in Equation 5 for many of the query concepts. The number of documents in the collection, $n_c$, is known from the document addresses associated with words in the word index. To calculate $f_i$, the number of documents in the collection containing concept i is determined by locating and counting the addresses of all documents in the database containing the concept. More particularly, the document addresses associated with each word in the word index corresponding to the concept are compared to remove duplicate addresses and the remaining number of document addresses is summed. The resulting sum is $f_i$. The frequency or number of times, $f_{ij}$, that concept i appears in document j can be calculated from the number of offset codes for the word (and its synonyms) associated with the document. Hence, the terms $idf_i$ and $tf_{ij}$ can be calculated, thereby leading to the probability factor, $P(c_i|d_j)$, for the concept for the document in accordance with Equation 5. However, this technique is useful only for those concepts whose concept frequency is represented in the word index. Certain concepts, such as phrases, are not ordinarily so represented, so it is an aspect of the present invention to provide a technique to estimate the representation concept frequency for such concepts.

Representation Concept Frequency Estimation

The inverse document frequency ($idf_i$) is predetermined for each representation concept in the document collection, except certain representations such as phrases, synonyms, proximities and thesaurus classes. For phrases, synonyms, proximities and thesaurus classes, the inverse document frequency is computed for each search. Identifying the inverse document frequency for a given phrase, synonym, proximity or thesaurus class requires processing through each document in the collection. In small collections, the computation of the inverse document frequency of a phrase, synonym, proximity, or thesaurus class may be performed without significant difficulty by examination of the word index to determine $f_i$, $n_c$ and $f_{ij}$ as described above. Hence, the inverse document frequency for the phrase may be calculated using equation 7. However, in the case of large collections (of the order of 500,000 documents), computation of the inverse document frequency for a phrase, synonym, proximity or thesaurus class representation requires significant processing, if all documents containing a query concept are to be examined. Moreover, in many circumstances the computation may lead to a result which is too insignificant to affect the ranking.

Consider, for example, a synonym class containing terms A and B where term A occurs in 10,000 documents in the collection of 500,000 documents and term B occurs in 10 documents. The frequency of the synonym class lies in the range of 10,000 to 10,010, resulting in a frequency difference of 10 documents in 10,010 or about 0.1%. Consequently, the range of the inverse document frequency, $idf_i$, lies between about 0.02000 and 0.02002, which is too small to significantly affect the result ranking. However, if term A appears in 10,000 documents and term B appears in 4,000 documents, the frequency is in the range of 10,000 and 14,000, leaving a 28.6% frequency difference and a range of document inverse frequencies between 0.02000 and 0.02800, which is significant.

One aspect of the present invention concerns the estimation of the inverse document frequency for a selected representation, such as a phrase, proximity, synonym or thesaurus class. More particularly, the representation frequency is estimated from a sample of the collection with sufficient accuracy, while avoiding extended computational resources in the evaluation of the entire collection. A sample of a plurality of documents is selected from the collection, and the representations in the sample documents are processed to identify the frequency that the selected representation occurs in the sample. Specifically, the "gaps," or the number of documents (g) occurring between occurrences of documents containing the selected representation, are identified, and the sum of the squares of the gaps (sq) are employed to estimate the correct representation frequency. The gaps are identified from the successive addresses of documents containing the concept as determined from the word index of the document database. The sequence of observed gaps are employed to estimate the maximum and minimum bounds ($f_{max}$ and $f_{min}$) of the true frequency within a preselected error rate. The frequency bounds are employed to compute the range of the probable inverse document frequency. When that range becomes sufficiently narrow as to insignificantly affect the result ranking, the midpoint of the frequency range is selected as the estimated frequency of occurrence of the selected representation.

After computing the frequency bounds for the given sample, if the difference between the bounds is too large that the selection of the midpoint as the estimated frequency of occurrence is likely to affect the result ranking, the sample is enlarged to include additional documents, and the frequency bounds are again computed. Ordinarily, mean and variance estimations are computed on the basis that each sample is independent, but in the present case the samples may not be independent because samples are taken sequentially, rather than randomly. To adjust for possible non-random sampling, the variation for the frequency bounds is estimated in two ways: first based on random sampling, and second based on gaps (numbers of documents found between documents containing the representation). The probable maximum frequency, $f_{max}$, and the probable minimum frequency, $f_{min}$, are computed in accordance with the following algorithms:

$$f_{max} = n_i + \frac{n_i(n_c - x_i)}{x_i - zs_i\sqrt{n_i}} + z\sqrt{\frac{n_i(n_c - x_i)}{x_i}} \quad \text{EQ 8}$$

and $$f_{min} = n_i + \frac{n_i(n_c - x_i)}{x_i + zs_i\sqrt{n_i}} - z\sqrt{\frac{n_i(n_c - x_i)}{x_i}} \quad \text{EQ 9}$$

where $n_i$ is the number of documents (or gaps between documents) in the sample containing the selected representation, $n_c$ is the number of documents in the collection, $x_i$ is the number of documents in the sample, $s_i$ is the greater of $xi/n_i$ or sd of the $n_i$ gaps, and z is the standard critical value for normal distribution for a preselected reliability, and where sd is the standard deviation and is represented by $$sd = \sqrt{\frac{sq}{n_i} - \left(\frac{x_i}{n_i}\right)^2} \quad \text{EQ 10}$$

where sq is the sum of the squares of the gaps, or the sum of the squares of the numbers of documents found between documents containing the representation.

It is preferred that the reliability of the estimation be within 0.95 (i.e., the maximum error rate should not exceed 5%). It can be shown that the standard critical value (z) for a normal distribution of the documents of the collection, within a 0.95 reliability, is 2.8070.

There are several constraints on the calculation of $f_{max}$ and $f_{min}$. First, if $f_{min}$ is smaller than the a priori minimum, then $f_{min}$ is set equal to the a priori minimum, and if $f_{max}$ is greater than the a priori maximum, then $f_{max}$ is set equal to the a priori maximum. To illustrate the a priori minimums and maximums, assume a synonym class containing terms A and B where term A appears in 10,000 documents and term B appears in 4,000 documents. Terms A and B could appear in the same or overlapping documents, meaning that term B could appear in as many as 4,000 documents with term A. Conversely, term B might appear in documents exclusive of term A. Consequently, although the actual occurrences of the synonym class is unknown, the synonym class appears in the range of 10,000 to 14,000 documents. Hence, an a priori minimum number of occurrences can be established at 10,000 (the number of occurrences of the most common term A), and an a priori maximum number of occurrences can be established at 14,000 (the sum of occurrences of both terms A and B). Similarly, in the case of a phrase containing two terms A and B (such as "independent contractor"), if A appears in 10,000 documents and B appears in 4,000 documents, an a priori maximum exists of 4,000 (the number of occurrences of the least common term B) because that is the maximum that the two terms could appear together.

Hence, the a priori maximums and minimums are derived from the pre-identified frequencies $f_i$ of individual terms (which form or are part of the concept) in the collection, and the type of concept (synonym, phrase, thesaurus or proximity).

Another constraint concerning the calculation of $f_{min}$ is that if the calculated $f_{min}$ is smaller than $n_i$ (the number of documents in the sample containing the representation), $f_{min}$ is set equal to $n_i$. Likewise, if the calculated $f_{max}$ is smaller than zero or is less than $n_i$, $f_{max}$ is set equal to $n_i + (n_c - x_i)$ (the number of documents in the sample containing the representation plus the number of documents of the collection yet to be considered).

The number of documents $x_i$ in the sample necessary to estimate the frequency of the selected representation is increased until the difference between the inverse document frequencies of the maximum and minimum bounds is smaller than some prescribed amount.

While the specific limit of the difference between the maximum and minimum inverse document frequencies is heuristic, it has been found that when the range of frequency values between $f_{max}$ and $f_{min}$ is so small that further refinement would not significantly alter the ranking of the ultimately selected documents, further computation of an estimated probable frequency for the selected representation may be halted. For purposes of the present invention, an inverse document frequency ($idf_i$) difference of 0.05 or less as an empirically selected stopping point, provides good results. The estimated inverse document frequency for the selected representation is thereupon selected at the mean between the maximum and minimum bounds. If the maximum and minimum bounds are accurate, they would each be located at a maximum error of 0.025 which is deemed acceptable for the present purposes. In practice, the correct frequency error is usually smaller than 0.025 because the correct frequency tends to lie in the center of the estimated range more often than near either the maximum or minimum bound. Tests have indicated that the average error for the estimated frequency for the selected representation is about 0.01.

Figure 7A:
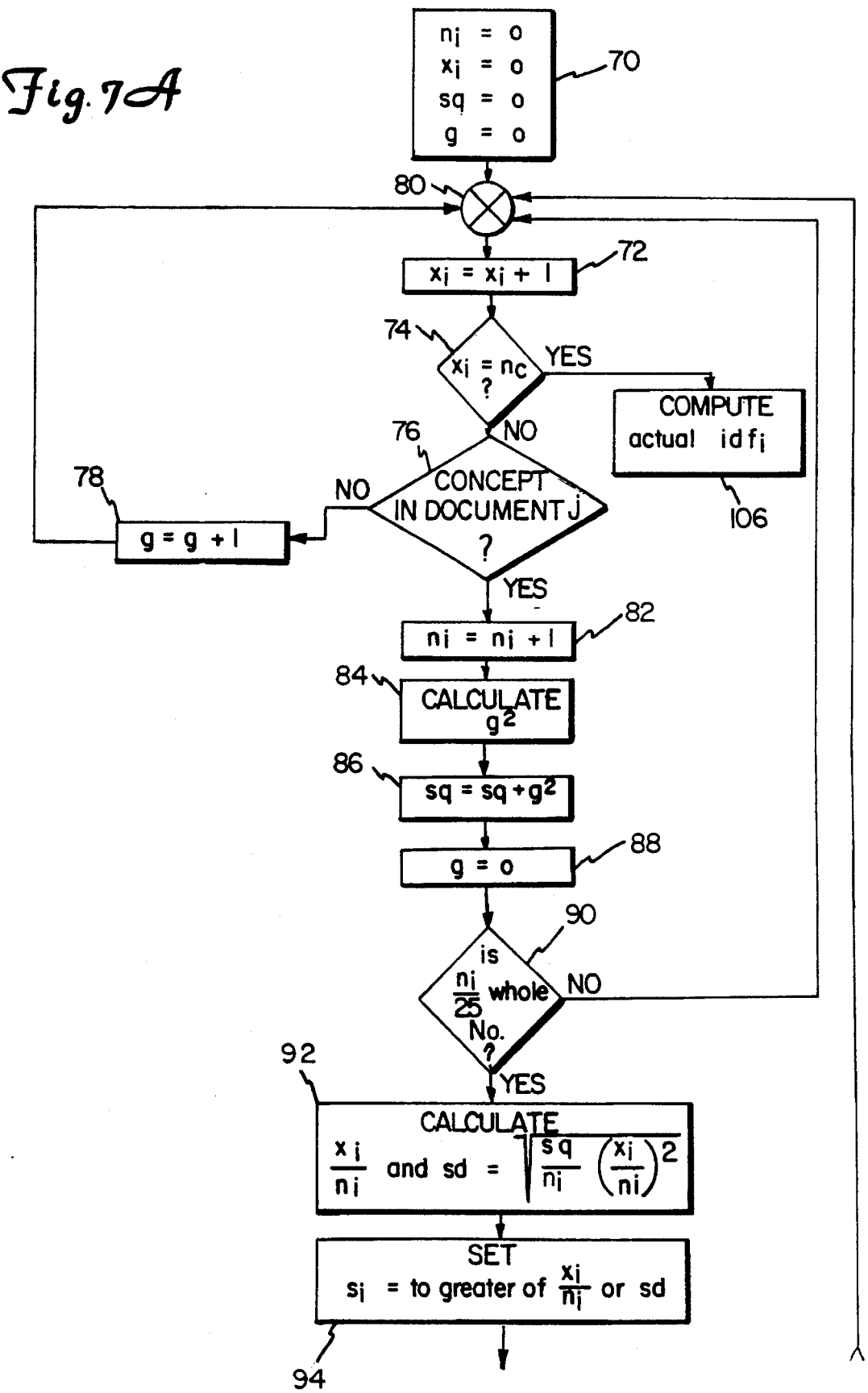

FIGS. 7A and 7B, taken together, comprise a detailed flowchart illustrating the steps of estimating the frequency of a selected concept, such as a phrase, synonym, proximity or thesaurus class. The process illustrated in FIG. 7A and 7B is carried out by a computer, which calculates the probable maximum and minimum frequencies $f_{max}$ and $f_{min}$ shown in Equations 8 and 9 and calculates the estimated inverse document frequency, $idf_i$, for the selected concept.

At step 70, the number of documents in the sample ($x_i$), the number of documents in the sample containing the selected representation ($n_i$), the gap size (g), and the sum of the squares of the gaps (sq), are each initialized to 0. At step 72, 1 is added to $x_i$ and at step 74 the increased $x_i$ is compared to $n_c$, the number of documents in the entire collection. If $x_i$ is smaller than $n_c$, the first document j is examined at step 76 to determine whether or not concept i appears in the document. If the concept does not appear in the first document, 1 is added to g at step 78 and the sequence loops back through point 80 to increment $x_i$ by 1. The process continues to loop until a document is identified containing concept i at step 76. By that point, the value of g has been incremented and is equal to the number of documents not containing concept i since identifying the previous document containing concept i. At step 82, $n_i$ is incremented by 1, and at step 84 $g^2$ is calculated and is added to sq at step 86. At step 88 g is reset to 0.

To conserve computing resources, it is preferred that $f_{max}$ and $f_{min}$ not be calculated each time a document is located containing concept i. Instead, it is preferred that a decision be made at step 90 which inhibits calculation of $f_{max}$ and $f_{min}$ until after only a predetermined number of documents containing the concept are identified. This has two effects: first, it conserves computing resources, and second, it permits use of the actual inverse document frequency ($idf_i$) for those concepts not appearing often in the collection. More particularly, it is preferred that a fixed number of documents, such as 25, be found containing concept i between each calculation of $f_{max}$ and $f_{min}$. Thus, at step 90 $n_i$ is divided by 25 and if the result is a whole number (indicating that $n_i$ is 25, 50, 75, etc.), then the process continues through steps 92, 94 and 96 to calculate $f_{max}$ and $f_{min}$. On the other hand, if $n_i$ is not equal to 25, 50, 75, etc., the process loops back through point 80 to continue to identify concept i in additional documents.

At step 92, $x_i/n_i$ and sd are calculated, sd being calculated in accordance with equation 10. At step 94, $s_i$ is set to the greater of $x_i/n_i$ or sd. At step 96, $f_{max}$ and $f_{min}$ are calculated.

It should be noted that g is the size of the gap or the number of successive documents not containing the concept between documents that do contain the concept. Thus, g is incremented at step 78 for each document not containing the concept and is reset at step 88 upon finding a document which does contain the concept. Term sq calculated at step 86 is the sum of the squares of the gaps g.

After the maximum and minimum estimated bounds, $f_{max}$ and $f_{min}$, are computed, maximum and minimum inverse document frequencies for the concept, $idf_{imax}$ and $idf_{imin}$, are calculated at step 98. At step 100, if $idf_{imin}$ is within 0.05 of $idf_{imax}$, the mean frequency $f_{mean}$ is computed from $f_{max}$ and $f_{min}$ at step 102, and the estimated inverse document frequency, $idf_i$, is computed at step 104 for the concept. As shown at step 100, if the range between the maximum and minimum inverse document frequencies is greater than 0.05, the process loops back to point 80 to expand the sample and the number of documents until the bounds of the estimates are within 0.05 at step 100 or until the entire collection has been examined ($x_i=n_c$) at step 74.

As indicated above, it is possible that the entire collection could be examined before determining an estimated inverse document frequency for the selected concept. This might occur, for example, where a concept very rarely appears in the documents. In such a case, at step 74, the computer determines that the number of documents in the sample ($x_i$) is equal to the number of documents in the collection ($n_c$), in which case the actual inverse document frequency for the concept is computed at step 106.

Partial Concepts (Phrases and Proximities)

As shown by Equation 4, the probability is computed for each concept/document pair, and the probabilities are summed. The result is normalized by the number of concepts in the query to determine the overall probability estimate that the document satisfies the information requirement set forth in the query.

Phrases are treated in a manner similar to proximity terms, except that a document which does not contain the full phrase receives a partial score for a partial phrase. For example, if a query contains the phrase "FEDERAL TORT CLAIMS ACT" and a document contains the phrase "tort claims" but not "Federal Tort Claims Act", the document will receive a score based on the frequency distribution associated with "TORT CLAIMS". FIG. 8 is a flow diagram illustrating the process of handling partial matches. As shown at step 120, the full phrase is evaluated against the collection as heretofore described. The inverse document frequency ($idf_i$) is determined for the full phrase (step 122), and if $idf_i$ is greater than a predetermined threshold (e.g., 0.3) the maximum belief achieved for any subphrase or single term is selected as the belief for the partial phrase (step 124). If $idf_i$ is smaller or equal to the threshold value (0.3), the preselected default belief (0.4) is assigned to the documents containing the partial phrase (step 126).

Since the frequency of "TORT CLAIMS" must equal or exceed that of the longer phrase, the probability estimate for the partial phrase would generally be lower than that assigned to documents containing the complete phrase. For phrases which occur extremely often (for example, where $idf_i$ is less than 0.3) it is preferred to dispense with the partial matching strategy, and treat the phrase as a pure proximity term by assigning the default belief (0.4) to all documents containing the partial phrase but not the full phrase (step 126). For phrases which appear less often (where $idf_i$ is greater than 0.3), the maximum belief achieved by any single word of the partial phrase is assigned to the belief for the partial phrase.

As previously explained, duplicate terms are purged from the search query. However, where duplicate terms appear in the search query, the component probability score for each document containing the term is multiplied by the query frequency. For example, if a document contains a term which appears twice in a natural language query receives a component probability of 0.425, the probability score is multiplied by 2 (to 0.850) for that term. When the probabilities are summed and normalized as described above, the normalization factor is increased to reflect the frequency of the duplicated term (increased by 1 in this example). Thus, the duplicated term is treated as if it had been evaluated multiple times as dictated by the query, but in a computationally simpler manner.

As described above, the probability estimates for each document/concept pair are summed and the result is normalized by the number of concepts in the query. For the example given in FIG. 4 the search query shown in block 46 employs eleven concepts, so the total probability for each document will be divided by 11 to determine the overall probability that the given document meets the overall query. For example, assume for a given document that the eleven probabilities are:

| 0.400 | 0.430 | 0.466 |
| 0.543 | 0.436 | 0.433 |
| 0.512 | 0.400 | 0.481 |
| 0.460 | 0.472 |       |

The overall probability is the sum of the individual probabilities (5.033) divided by the number of concepts (11) for a total probability of 0.458. This indicates a probability of 0.458 that the document meets the full query shown in block 40 in FIG. 4. The probability is determined for each document represented in the database, whereupon they are ranked in accordance with the value of the probability estimate to identify the top D documents. The ranking or identification is provided by computer 32 (FIG. 3) to computer 20 for display and/or printout at output terminal 22. Additionally, the document texts may be downloaded from computer 32 to computer 20 for display and/or printout at output terminal 22.

Probability Thresholds

As previously described, the probabilistic document retrieval system retrieves a predetermined number (D) of documents having the highest probability of meeting the information need set forth in the query. These probabilities are identified by the normalized sum of the probabilities of each representation in the document matching the concept in the query. Significant processor resources are required to compute these probabilities for each document in a large document database, for example about 500,000 documents or more. To reduce processing resources, it is desirable to limit probability computations to a reasonable number.

One technique to reduce processing resources is to employ a probability threshold against which the probabilities of documents are compared to determine whether or not the probability of a given document meets or exceeds the threshold. For example, in a document retrieval network designed to retrieve 10 documents, the probability threshold may be set equal to the probability of the lowest ranked document of 10 selected documents. To identify 10 documents from a database of 500,000 documents, the first 10 documents of the database are listed to a result list (making the initial ranking of the top 10). A probability threshold is set equal to the probability of the lowest-ranked document of the first 10 selected documents. The probability of the 11th document is computed and compared against the probability threshold. If the probability of the 11th document exceeds that lowest ranked document of the original 10, the 11th document is entered into the result list of 10 selected documents and the prior lowest ranked document is removed. A new probability threshold is set to the probability of the new lowest ranked document of the original 10 selected documents. Hence, the probability threshold is a "running" threshold, constantly updated and increased in value as additional documents are identified which exceed the previous threshold.

It will be appreciated that at some point in the document identification process, the threshold becomes so high that many documents may be discarded from consideration after consideration of only a few of the representation probabilities. Assume, for example, a query containing eleven concepts and a probability threshold of 0.8965 (well into the document identification process). For a document to meet the threshold, it must have a minimum sum of individual probabilities of 9.8615 (11×0.8965). Under such circumstances, a low representation probability amongst the first few representations may result in a mathematical impossibility of meeting the threshold. For example, if the first two representations of a document have probabilities of 0.311 and 0.400, giving a sum of 0.711, it will not be possible for that document to make the result list of 10. Even if the representation probabilities matching the other nine concepts each had a probability of 1.0, the maximum sum of probabilities would be 9.711 which is normalized to a maximum probability of 0.8828, below the probability threshold. Consequently, it is unnecessary to calculate the additional representation probabilities for the document or to further process the document's probabilities.

It can be appreciated from the foregoing that comparing the document's probabilities against the threshold can provide a significant savings in processing resources.

While the foregoing probability thresholds provide significant savings in processing resources, particularly well into the search, very little savings is realized at the early stages of the search. FIG. 9 is a graph illustrating a threshold setting technique as described above. The process commences with a probability threshold of zero, following curve 130. When the predetermined number of documents D are initially identified, the initial threshold is established as the lowest probability of the initial 10 documents, and subsequent documents are compared against the threshold. As additional documents are processed and the threshold value increases, it can be appreciated from FIG. 9 that the threshold value follows curve 130 approaching maximum threshold level 132. It can be shown that the documents requiring examination against the probability is high at the early stages of the process and decreases as the process advances. Hence, the area of the graph of Figure 9 above the curve of line 130 is representative of the number of documents requiring processing and is representative of the required processing resources.

One feature of the present invention resides in the early estimations of the probability threshold for documents meeting the information need of the query. More particularly, by selecting a sample of documents and setting the initial probability threshold as equal to the probability of the document in the sample having the highest probability, an initial threshold may be established against which further documents may be compared as previously described. This "running start" is shown in FIG. 9 as the initial threshold for the process.

As the search continues through the collection, fewer documents have their probabilities scored and the probability threshold increases. Hence, document selection follows curve 134 in FIG. 9. The establishment of an initial threshold as described, results in a smaller area above line 134; the shaded area 136 represents a reduction in processing resources required for conducting the search.

It can be statistically shown that a document retrieval system, seeking to retrieve 10 documents meeting an information need defined by a query from a document collection of 500,000 documents, will, with a 5% maximum probable error rate, find one document in the first 309 documents, two documents in the first 11,095 documents, three documents in the first 25,070 documents, and so on in accordance with the following Table I:

TABLE I

| Sequence | Limit (D) |
| --- | --- |
| 309 | 1 |
| 11,095 | 2 |
| 25,070 | 3 |
| 48,843 | 4 |
| 80,269 | 5 |
| 118,159 | 6 |
| 161,889 | 7 |
| 211,278 | 8 |
| 266,579 | 9 |
| 500,000 | 10 |

The software algorithm for selecting the sequence of numbers for Table I is set forth below, where cs is the collection size (equal to $n_c$, the number of documents in the collection), gs is the goal size (equal to D, the number of documents to be selected or identified) and me is the maximum error sought. For Table I, cs is 500,000, gs is 10 and me is 0.05.

SOFTWARE ALGORITHM

```
me = me ÷ ((gs − 1) * 100)
conf = 1.0 − me
p    = gs ÷ cs
lowi = (−log(conf)) ÷ p      (natural log)
IF lowi = 0 THEN table(1) = lowi + 1
             ELSE table(1) = lowi
DO (j = 1 to (gs − 2))
    lowi = lowi + 1
    oldhi = cs − 1
    WHILE ((oldhi − lowi) <> 1)
        highi = ((lowi + oldhi − 1) ÷ 2) + 1
        lambda = highi * p
        term = exp(−lambda)
        sum = term
        DO i = 1 TO j
            term = term * (lambda ÷ i)
            sum = sum + term
        ENDDO
        IF sum > conf THEN lowi = highi
                      ELSE oldhi = highi
    ENDWHILE
    table (j+1) = lowi
ENDDO
table(gs) = cs
```

The forgoing software algorithm and Table I are employed to statistically optimize the probable document distribution in the collection, and identifies one document to the result list during the first iteration, two documents to the result list during the second iteration, etc. until the final selection of ten documents are entered to the result list during the tenth iteration. During each iteration, a new sample of documents is selected from the collection, each sample being distinct from every other sample. Thus, referring to Table I, the first sample comprises documents 1 through 309, the second sample comprises documents 310 through 11095, the third sample comprises documents 11096 through 25070, etc. During the first iteration, the one document having the highest probability of meeting the information need defined by the query is selected from documents 1 through 309. During the second iteration, two documents having the two highest probabilities are selected from the group consisting of the sample of documents (documents 310 through 11095) plus the one document selected from the previous iteration. During the third iteration, three documents having the three highest probabilities are selected from the group consisting of documents 11096 through 25070 plus the two documents selected during the second iteration. The process continues through all iterations (10 in the example) to identify the predetermined number D of documents (10 in the example).

It is evident from the foregoing that if a given sample, such as the third sample, has two documents having probabilities which exceed the lowest of the previously selected documents, one previously selected document will be removed from the selection list. The ultimately selected documents, being ten in number, are not necessarily selected one from each of the ten samples. Instead, the selected documents are those ten documents having the highest probability of meeting the information need defined by the query, within a given error, such as 5%. While the above software algorithm sets forth the sample selection technique for any given number of documents to be identified, the above Table I sets forth a preferred example in connection with a document database of 500,000 documents selecting 10 documents most likely to meet the information need. Clearly, the algorithm may be used to provide the parameters for databases of other sizes, selection of other numbers of documents, and tolerance within other maximum error rates. Moreover, the algorithm may be modified to fit other examples in other situations, and, in fact, other algorithms are possible to define the sampling technique.

It may be desirable to employ the probability threshold technique described above with the statistical optimization selection described above. Hence, referring to Table I, the probability threshold may be set from the first sample requiring that documents selected during successive iterations also equal or exceed the probability threshold. As the processing continues, if the document of the first sample is ultimately replaced (that is, for a given iteration the probability of the first sample document is exceeded by the probabilities of at least the number of documents required by the iteration), a new threshold is established as the threshold of the new lowest document. Consequently, the probability threshold level continues to advance as documents are continued to be identified.

Figure 10:
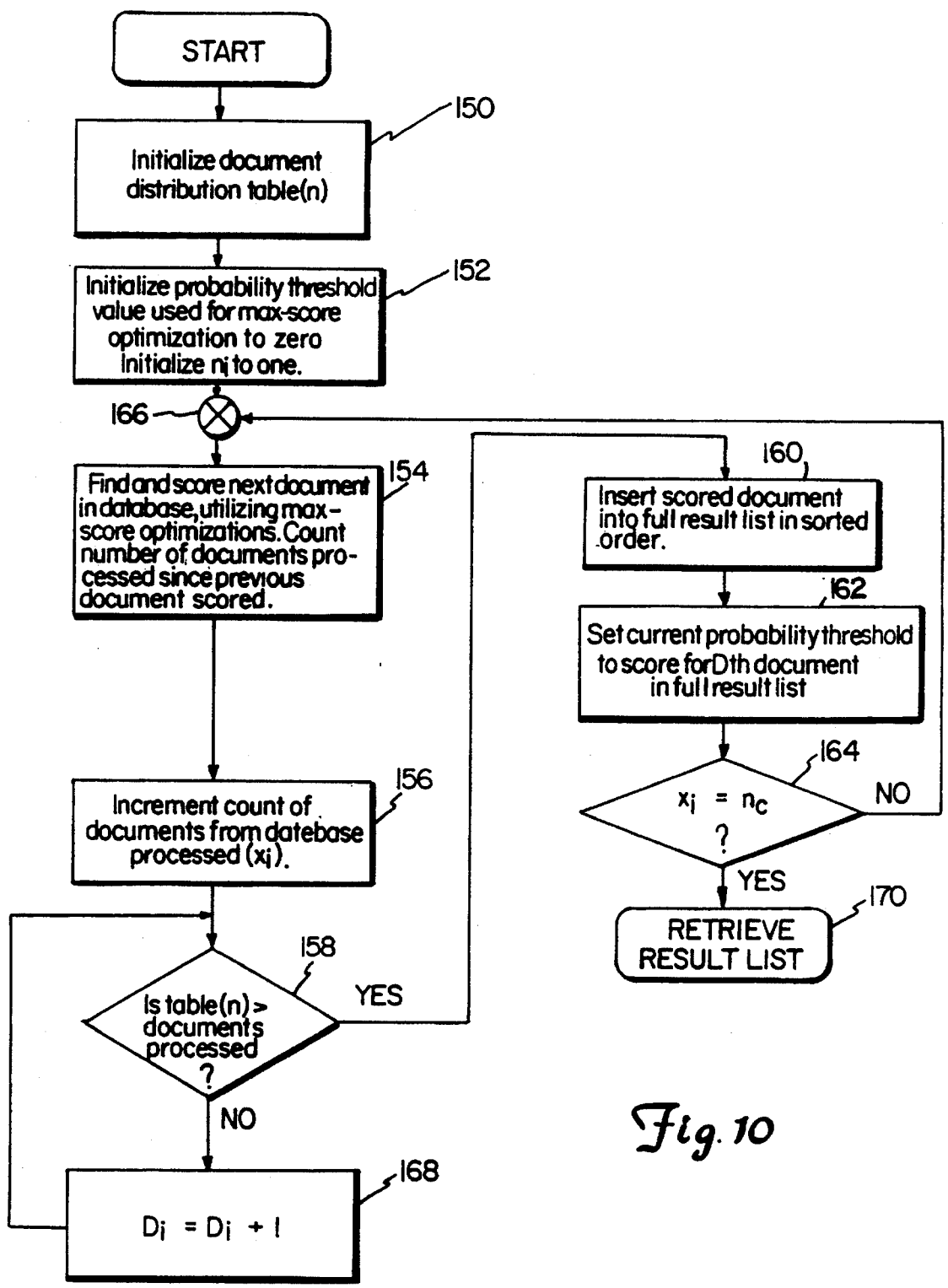
FIG. 10 is a detailed flowchart identifying the steps for setting probability thresholds and optimizing document retrieval according to the present invention.

FIG. 10 is a flowchart of the steps of the statistical optimization selection technique of developing the probability threshold and document distribution optimization for the present invention.

More particularly, at step 150 the document distribution table of Table I is initialized to meet the criteria for error, numbers of documents sought, and collection size in accordance with the above-described software algorithm. At step 152, the probability threshold value is initialized to 0 and the number of documents sought to be identified, D, is initialized to one. At step 154, a document from the collection is scored utilizing the maximum score optimization technique, explained below in connection with FIG. 11. At the same time, the number of documents processed since the previous document was scored is identified. At step 156, a count is incremented identifying the total number of documents from the collection which had been processed.

Referring to Table I, if the first thirty documents of the collection contain no representations matching a concept of the query, the documents will not be scored because their probabilities would be 0.4. If the thirty-first document is the first document of the collection having representations which meet concepts of the query, that document is located and scored at step 154 using the maximum score optimizations described below. At the same time, a count of 31 is entered, representative of the number of documents processed ($x_i$), Since the thirty-first document is the only document in the result list, it is placed at the top of the result list.

At step 158, the value from the table corresponding to $D_i$ is compared against the number of documents $x_i$ counted at step 156. If the number of document, $x_i$, is smaller than the number $D_i$, the process continues to step 160. At step 160, each scored document is entered into the result list stored in the memory of the computer in descending order of probabilities. Thus, the document with the highest probability appears at the top of the result list whereas the document meeting the maximum score optimizations having the lowest probability is at the bottom of the list. In the initial iteration, $x_i$ is 31 since thirty-one documents had been processed, and the value from Table I is 309 (corresponding to $D_i$=1).

Since the value from the table, 309, is greater than $x_i$, 31, the probability threshold is set at step 162 to the score for the Dth document in the result list, which in the example is the thirty-first document. At step 164, the number of documents processed, $x_i$, is compared to the total number of documents in the collection, $n_c$, and if the number of documents processed is smaller than the number of documents in the collection, the process loops back through point 166 to return to step 154. Any further documents which have probabilities less than the threshold probability (or which cannot mathematically achieve a probability greater than the probability threshold after calculation of less than all representation probabilities) are excluded (or not scored) at step 154.

Assume document one hundred eighty has a probability greater than the probability threshold established by document thirty one. Hence, document one hundred eighty is identified at step 154 and inserted into the result list in probability order, which is greater than document thirty one. At step 156, $x_i$ is incremented to indicate the count, 180, of the number of documents thus far processed, which count is still smaller than 309, the number in Table I associated with $D_i$. Consequently, the sequence proceeds to step 160 to insert document one hundred eighty into the result list. At step 162 the probability threshold is set to the score of the Dth document in the result list. Since $D_i$ is 1, the probability threshold is set to the score of document one hundred eighty.

Assume the next document having a probability greater than the probability threshold set by document one hundred eighty is document six hundred ten. Document six hundred ten is found and scored at step 154. At step 156 the count $x_i$ is incremented to 610, and since the value 309 from Table I is not greater than 610 at step 156, $D_i$ is incremented by 1 at step 168 so that the new value from Table I to be considered is 11,095. The process loops back to step 158 where the value 11,095 from Table I is found to be greater than 610. Hence the process continues to step 160 where document six hundred ten is inserted in the result list in probability order. At step 162 a new probability threshold equal to the Dth document in the result list is to be set. In this case, however, nothing occurs because $D_t$ is now set to 2, meaning that both documents one hundred eighty and six hundred ten appear in the result list, and the probability threshold will continue to be set to the score of the document of the result list having the lowest probability, namely document one hundred eighty.

The process continues through the remainder of the database, incrementally increasing the value from Table I against which the document number is processed at step 158, the process continuing until 10 documents are identified and all documents in the database have been processed. When this occurs, $x_i$ equals $n_c$ at step 164 and the final result list is retrieved at step 168.

It might be advantageous, particularly where small document collections are to be searched and processing power is large, to perform the process of FIG. 10 for only a single iteration to find the document of the first sample having the highest probability and setting the probability threshold to the probability of that document for scoring the remainder of the document collection in the manner described above. Thus, the probabilities of documents added to the result list must exceed the initial probability threshold, at least until the preselected number of documents is added to the result list. Thereafter, the probability threshold is increased as additional documents having higher probabilities are added to the list and documents with the lowest probabilities are removed from the list.

In any event, if less than the preselected number of documents are ultimately identified to the result list, a new probability threshold may be established slightly below the probability of the document on the result list with the lowest probability and the entire collection re-scored as described above.

Maximum Score optimization

Figure 11:
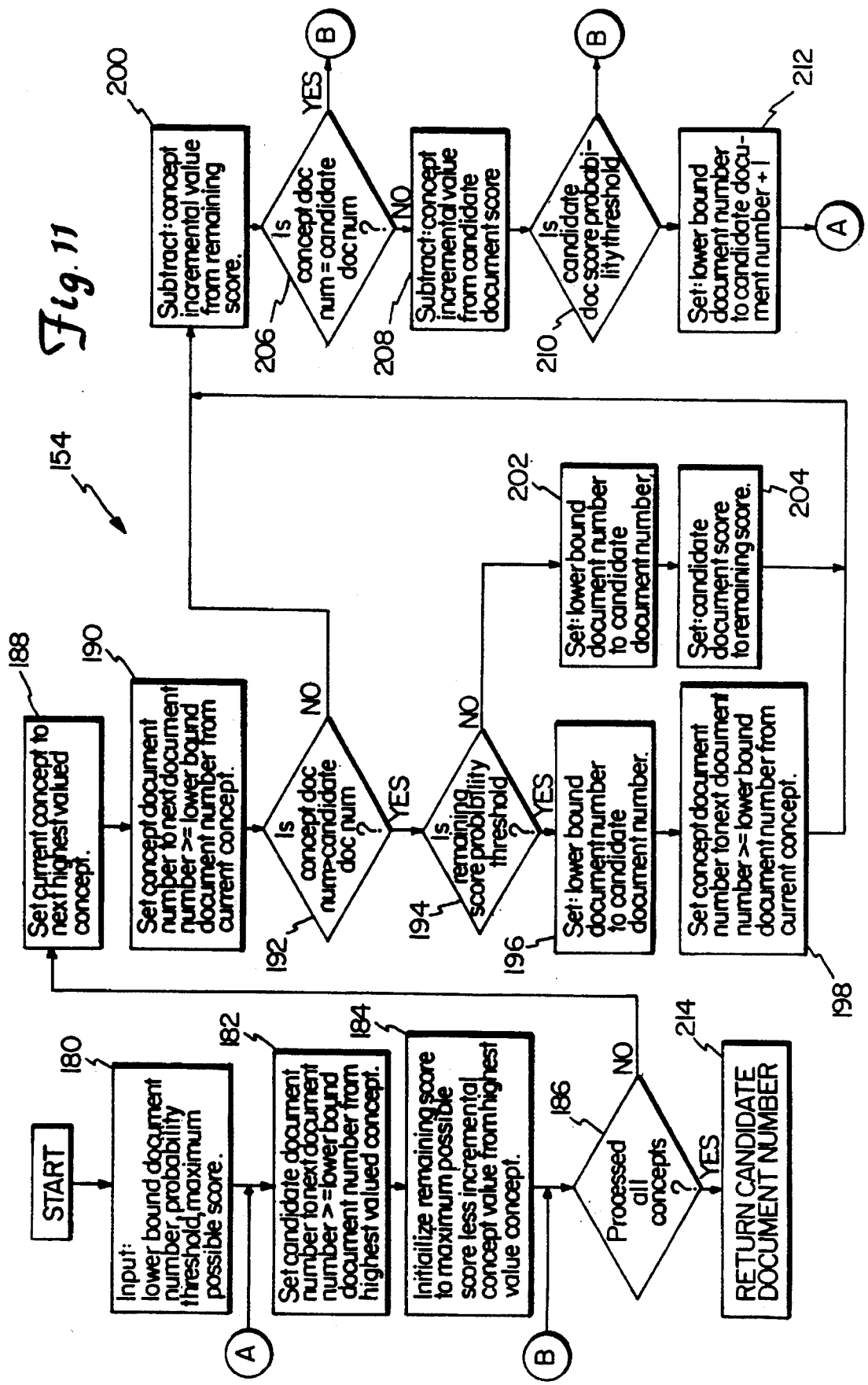
FIG. 11 is a detailed flowchart illustrating the maximum score optimization techniques according to the present invention.

This technique is illustrated in the flow chart of FIG. 11. More particularly, FIG. 11 illustrates the iterative loops for scoring documents employed at step 154 in FIG. 10. Each document in the document database has a document number associated with it. The maximum score optimization commences with the concept $i_1$ in the query having the highest $idf_i$. A lower bound document number is chosen (such as the lowest document number in the database). The first document $d_j$ whose document number is greater than the lower bound document number and which contains the concept $i_1$ is selected as a candidate document.

A remainder score is initialized to the maximum possible score less the value that document $d_j$ scores for the concept $i_1$ being examined. Thus, the remainder score value represents the maximum score which each document which does not contain concept $i_1$ could achieve without concept $i_1$. The process continues by iterating through each of the concepts $i_2$, $i_3$, etc. The concepts are processed in descending order of concept $idf_i$ value. As noted above, the concept with the highest $idf_i$ is the concept which appears least frequently in the collection and is more likely to be a good discriminator than a concept which appears more often. The processing for each concept commences with the document having a document number greater than or equal to the lower bound document number.

In the processing, three conditions can occur.

1. If the document number for the current concept is equal to that of the candidate document, the candidate document contains the concept and no change is made to the maximum score. Instead, the process continues to the next concept.

2. If the document number for the current concept is greater than that of the candidate document, the current document does not contain the concept and the value of the current concept is subtracted from the maximum score for the candidate document and the remainder score is adjusted. If the maximum score is still high enough that the candidate document might still be selected, the processing will continue to the next concept. If not, the candidate document is discarded and the processing starts over with the next higher document number as the candidate document.

3. If the document number for the current concept is less than that of the candidate document, a document exists with a lower number which must be evaluated before continuing with the candidate document.

The remainder score tabulated for each document represents the maximum score that document can achieve based on the concepts processed up to that point and the possibility that it contains all the subsequent concepts. As each concept is processed, the remainder score for the document is reduced by the value of the concept for each document in which the concept does not appear. In considering the remainder score, two possibilities exist.

1. If the remainder score is less than the minimum document score necessary to remain in the result list, then that document, and all other documents up to the candidate document number, can be discarded, since it is not possible for any of them to achieve a document score high enough to remain in the result list. In this situation, the next document number which is greater than or equal to the candidate document number is selected for the concept and the processing continues as described above.

2. If the remainder score is not less than the minimum document score necessary to remain in the result list, then the document is considered as a candidate for the result list. In this case, the document score for the document is set to the current remaining score and the candidate document number is reset.

The process continues until a candidate is found having a maximum possible score greater than the probability threshold required to remain in the result list.

The process of the maximum score optimization may be explained with reference to the flowchart of FIG. 11. At step 180 the lower bound document number, probability threshold (from step 152 or 162 in FIG. 10) and the maximum possible score are inputted. For the initial iteration for a given document, the probability threshold is initialized to 0 at step 152 in FIG. 10 and the maximum possible score is initialized. The lower bound document number is set to the first document in the database desired to be reviewed. At step 182, the first document having a document number greater than or equal to the lower bound document number and which contains the concept having the highest $idf_i$ is identified as a candidate document. Thus, the document number is identified for the first document containing the concept. At step 184, the remainder score for all other documents having a lower number is initialized to be equal to the maximum possible score less the incremental concept value from the missing concept $i_1$ having the highest $idf_i$. At step 186, a decision is made as to whether all the concepts have been processed, and if they have not, the current concept is set to the concept $i_2$ whose $idf_i$ is next highest in value below the first concept $i_1$, at step 188. At step 190, the document number is set to the document number of the next document greater than or equal to the lower bound document number for the current (second) concept $i_2$. At step 192, if the document number of the document containing the concept is less than the current candidate document number, then the decision is made at step 194 whether the remainder score is smaller than the probability threshold initialized at step 152 or set at step 162 in FIG. 10. If the remainder score is smaller than the minimum probability threshold, then the lower bound document number is set to the current candidate document number and the document number of the next document containing the concept $i_2$ currently being processed is set to the next document number greater than or equal to the current lower bound document number for the current concept. The concept incremental value is subtracted at step 200 from the remainder score. If, at step 194, the remainder score is greater than or equal to the probability threshold, then the candidate document number is set, at step 202, to the document number of the next document containing the concept, and the candidate document score is set, at step 204, to the remainder score. The process then continues to step 200 to subtract the concept incremental value from the remainder score for the documents not containing the concept.

If at step 192 the document number containing the concept is greater than or equal to the candidate document number, then the process continues directly to step 200 where the concept incremental value is subtracted from the remainder score for the documents not containing the concept.

At step 206, if the document number containing the concept is equal to the candidate document number, then the candidate document is found to contain the concept, and the process returns to step 186 and processes through the loop again for the next concept. If the document number containing the concept is not equal to the candidate document number, then the concept incremental value is subtracted from the candidate document score at step 208. If the resulting candidate document score is greater than the probability threshold, the process loops back through step 186 again. On the other hand, if the candidate document score is not greater than the probability threshold, the lower bound document number is set to the candidate document number plus 1 and the process reloops to step 182.

If a candidate document loops through the process of FIG. 11 through all of the concepts of the query, and the document score is greater than the probability threshold at step 210, step 186 identifies that all concepts have been processed and returns the document at step 214 for insertion into the full result list in sorted order at step 156 in FIG. 10. The process terminates for a given threshold value only when a candidate is found, after all concepts have been examined, which has a maximum possible score greater than the probability threshold required to remain in the result list. The process iterates through the loops illustrated in FIG. 10 until the required number of documents for the result list is identified. The documents may then be retrieved from database using the result list at step 170, the scoring of each document occurring through the iterations of the loops of FIG. 11.

It may be desirable to incorporate certain relational constraints on the placement of documents into the result list. As one example, it might be desirable to limit the search output to documents dated after a given date. Suffice it to say that such a constraint can be imposed on the document retrieval system in a manner well known in the art.

Document Retrieval

Figure 12:
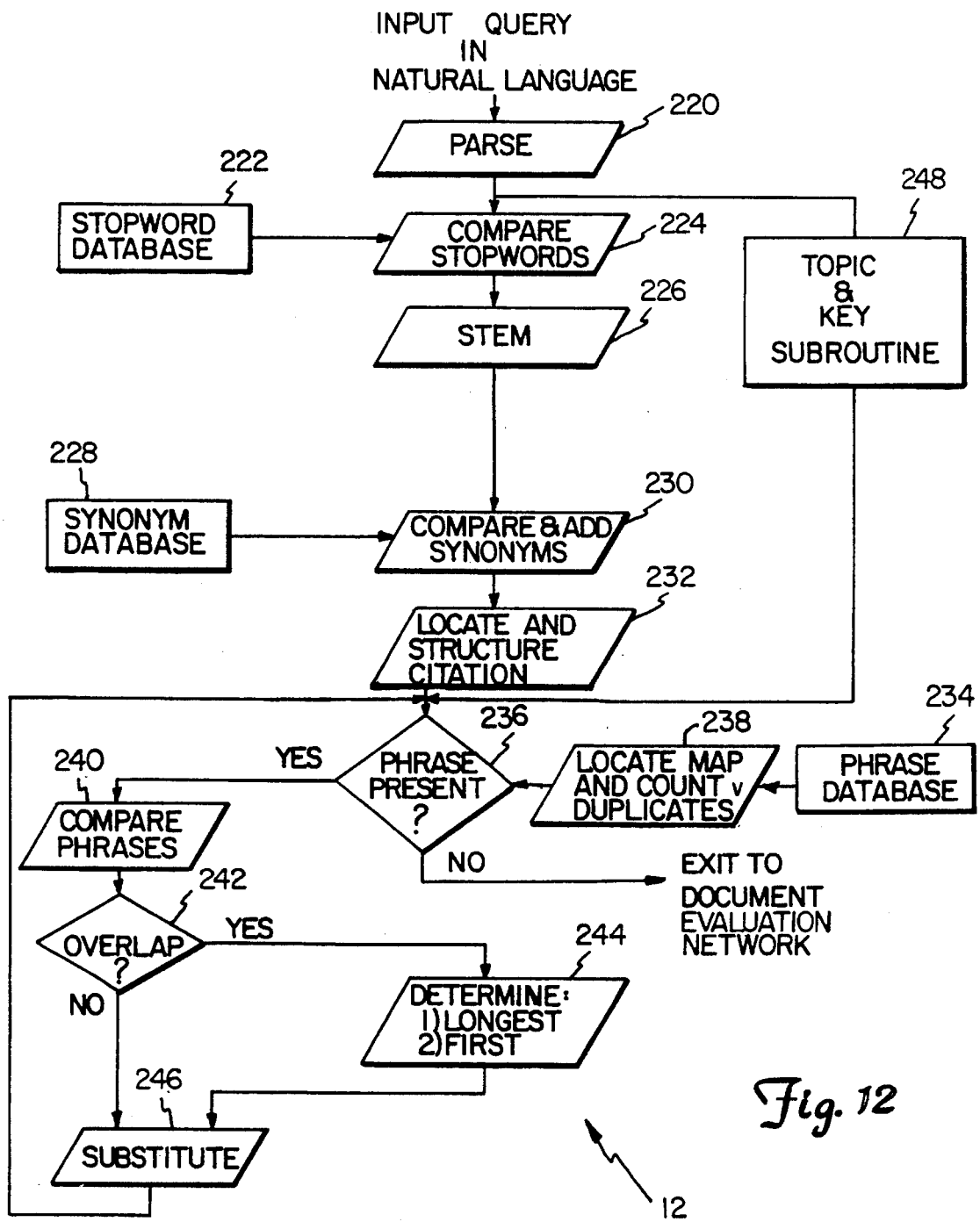
FIG. 12 is a detailed flowchart of the process for creating the query network for a probabilistic information retrieval network.
Figure 13:
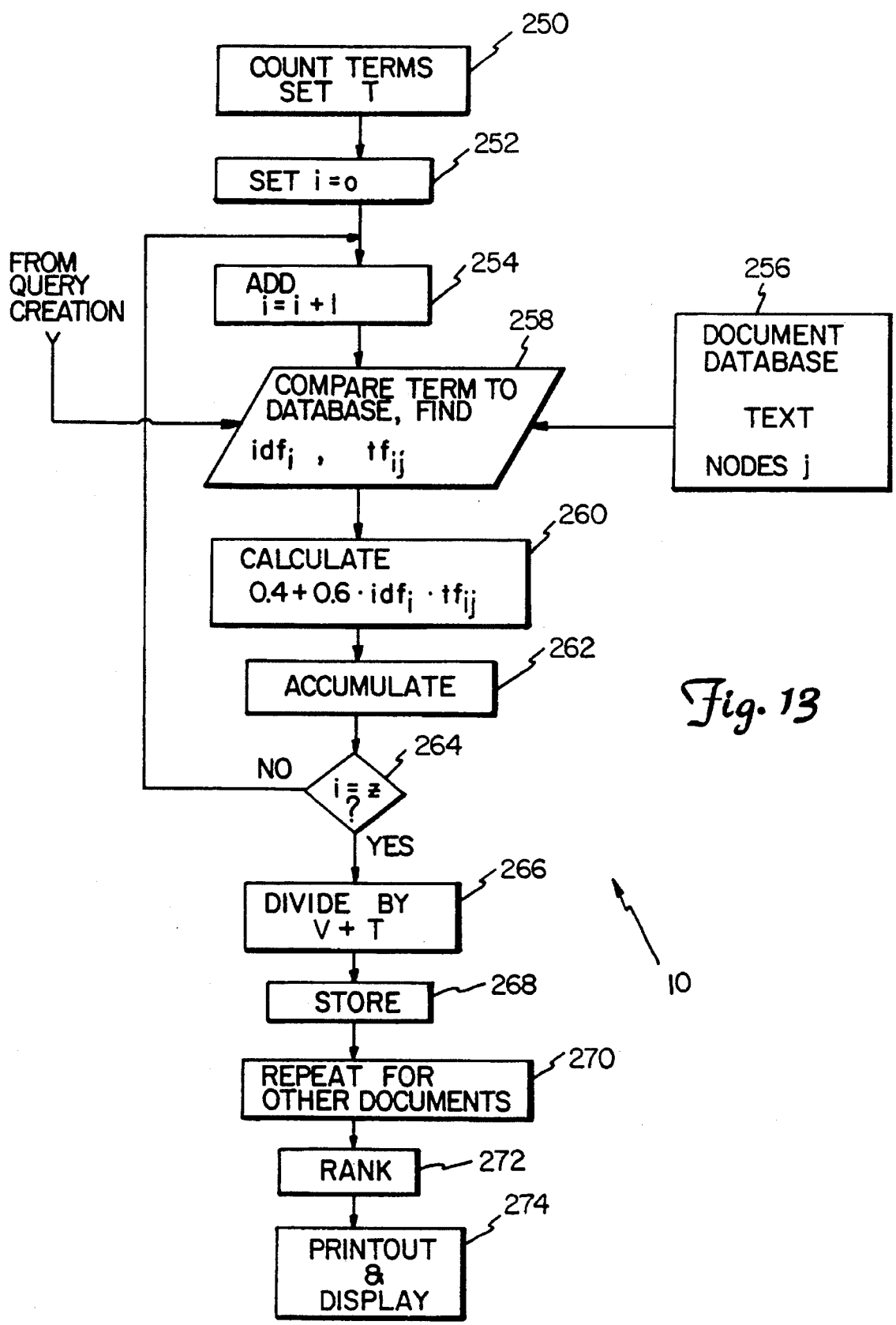
FIG. 13 is a detailed flowchart of the process for evaluating a document network used with the query network shown in FIG. 12.

FIGS. 12 and 13 are flowcharts detailing the construction and evaluation of an inference network, FIG. 12 being a detailed flowchart for constructing the query network 12 and FIG. 13 being a detailed flowchart for evaluation the query network in the context of the document network 10. As heretofore described, an input query written in natural language is loaded into the computer, such as into a register therein, and is parsed (step 220) compared to the stopwords in database 222 (step 224) and stemmed at step 226. The result is the list 42 illustrated in FIG. 4. Using synonym database 228, the list is compared at step 230 to the synonym database and synonyms are added to the list. As will be explained hereinafter, the handling of synonyms may actually occur after handling of the phrases. Citations are located at step 232 as heretofore described. More particularly, a proximity relationship is established showing the page number within five words of the volume number, without regard to the reporter system employed. The handling of citations, like the handling of synonyms, may be accomplished after phrase resolution, if desired.

Employing phrase database 234, a decision is made step 236 as to whether or not phrases are present in the query. If phrases are present, a comparison is made as step 240 to identify phrases. At step 242 a determination is made as to whether successive phrases share any common term(s) (an overlap condition). More particularly, and as heretofore described, terms which are apparently shared between successive phrases are detected at step 242. At step 244 a determination is made as to which phrase is the longer of the two phrases, and the shared term is included in the longer phrase and excluded from the shorter phrase. As a result of deleting the shared term from the shorter phrase, the resulting shorter phrase may not be a phrase at all, in which case the remaining term(s) are simply handled as stemmed words. On the other hand, if the two phrases are of equal length, then the shared term is accorded to the first phrase and denied to the second phrase.

After overlap conflict is resolved at step 244, the resulting phrase substitution occurs at step 246. The process loops back to step 236 to determine if phrases are still present, and if they are the process repeats until no further phrases are present. At step 238, all duplicate terms are located, mapped, counted and removed, with a count V representing the number of duplicate terms removed. Thus, the search query illustrated at block 46 in FIG. 4 is developed.

As heretofore described, the handling of synonyms and citations may occur after resolution of the phrases, rather than before.

As illustrated in FIG. 13, the resulting search query is provided to the document network where, at step 250 the number of terms T is counted, at step 252 i is set to 0 and at step 254 1 is added to i. Using document database 256 which also contains the text of the documents, the inverse document frequency ($idf_i$) is determined and the probability estimate ($tf_j$) is determined at step 258. As noted above, both $tf_{ij}$ and $idf_i$ are calculated from addresses, document numbers and offset data in the word index of the document database. The estimated inverse document frequency ($idf_i$) is also added to the database by a temporary memory or register. The component probability is determined at step 260 as heretofore described and is accumulated with other component probabilities at step 262. At step 264 a determination is made as to whether or not i equals T (where T is the number of terms in the search query). If all of the terms have not been compared to the database, the process is looped, adding 1 to i and repeated for each term until i equals T at step 264. As heretofore described, when terms having duplicates deleted from the input query are processed at step 258, the probability for such terms is multiplied by the number of duplicates deleted, thereby weighing the probability in accordance with the frequency of the term in the original input query. Consequently, at step 266, it is necessary to divide the accumulated component probability for the document by V+T (where V is the number of duplicate terms deleted from the input query) to thereby normalize the probability. The probability for each document is stored at step 268 and the process repeated at step 270 for the other documents. At step 272 the documents are ranked in accordance with the determined probabilities, and the top ranked documents are printed out or displayed at step 274.

As previously described, the scan technique may be a concept-based scan, rather than the document-based scan described. Further, as previously described, the scan may be aborted after less than complete scan of any given document if the probabilities result in a determination that the document will not reach the cutoff for the D top-ranked documents to be displayed or printed.

While the present invention has been described in connection with a time-shared computer system shown in FIG. 3 wherein search queries are generated by PC computers or dumb terminals for transmission to and time-shared processing by a central computer containing the document network, it may be desirable in some cases to provide the document network (with or without the document text database) to the user for direct use at the PC. In such a case, the document database would be supplied on the same ROM 24 as the databases used with the search query, or on a separately supplied ROM for use with computer 20. For example, in the case of a legal database, updated ROMs containing the document database could be supplied periodically on a subscription basis to the user. In any case, the stopwords, phrases and key numbers would not be changed often, so it would not be necessary to change the ROM containing the databases of stopwords, phrases and key numbers.

Although the present invention has been described with reference to preferred embodiments, workers skilled in the art will recognize that changes may be made in form and detail without departing from the spirit and scope of the invention.

What is claimed is:

1. In a computer system for identifying a predetermined number of documents of a document collection containing representations that have high probabilities of matching a query containing a plurality of concepts, in which the system has a database containing identifications of documents in the document collection and defining a plurality_ of representations representing the contents of the documents, the collection comprising a plurality_ of documents, and query means for defining the query, apparatus comprising:

sample selection means for iteratively selecting successive samples of a plurality of documents from the collection, each sample containing fewer documents than the entire collection and each successive sample containing documents different from each previous sample;

processing means responsive to the sample selection means for calculating, during each iteration, probabilities that documents contained in the sample contain representations that match the query and for identifying a preselected number of documents having the highest probabilities, the documents being identified during an iteration from a group consisting of the respective sample of documents and the documents identified during the next previous iteration, the preselected number being different for each iteration and no greater than the predetermined number; and output means outputting the identifications of the predetermined number of documents identified by the processing means.

2. The apparatus according to claim 1 further including threshold setting means responsive to the processing means for setting a probability threshold equal to the probability of a first identified document.

3. The apparatus according to claim 2 including determining means operable during each respective iteration and responsive to the identification of the preselected number of documents by the processing means to determine if an additional document of the respective sample has a probability greater than the probability threshold, the processing means being responsive to the determining means identifying an additional document having a probability greater that the probability threshold to replace the previously-identified document having the lowest probability by the additional document, and the threshold setting means being responsive to the processing means to reset the probability threshold to the probability of the identified document having the new lowest probability.

4. The apparatus according to claim 1 wherein the preselected number is equal to the number of the respective iteration, and the predetermined number is equal to the number of the last iteration.

5. The apparatus according to claim 1 including estimating means responsive to the processing means for estimating a maximum probability for a second document different from the first document based on a partially calculated probability for the second document and an assumption that the representations in the second document match the concepts of the query for which probabilities have not been calculated, the processing means being responsive to the estimating means to calculate partial probabilities that representations in the second document match concepts of the query until either the estimated maximum probability does not at least equal the threshold or the probability is calculated for all the concepts in the query.

6. The apparatus according to claim 5 wherein the output means includes a result list ranking the identified documents in probability order, the threshold setting means being responsive to the result list to reset the probability threshold equal to the probability of the document lowest on the result list.

7. The apparatus according to claim 1 wherein the processing means includes a result list ranking the identified documents in probability order.

8. A system for identifying documents matching a comprising:

a memory containing a database containing identification of documents in a document collection and defining a plurality of representations representing the contents of the documents, the collection comprising a plurality of documents, the database further containing indications of the frequencies of occurrence of documents containing first representations in the collection;

computer means responsive to a query defining a plurality of concepts, the computer means including matching means for matching the concepts to representations, estimating means for estimating the frequency of occurrence of documents containing a second selected representation in the collection, the second selected representation being different from any of the first representations, the estimating means including sample selection means for selecting a sample comprising a plurality of documents from the collection, the sample containing fewer documents than the entire collection;

frequency identifying means responsive to the sample selection means for identifying the frequency of occurrence of documents containing the second selected representation in the selected sample of documents;

processor means responsive to the memory means and to the frequency identifying means for calculating a maximum and a minimum probable frequency of occurrence of documents containing the second selected representation in the collection; and selection means responsive to the processor means for selecting the midpoint, of the maximum and minimum probable frequencies as the estimated frequency of occurrence of the second selected representation;

retrieval means for selecting documents meeting the query based on the frequencies of occurrence of documents containing first representations which match the concepts and the estimated frequencies of occurrence of documents containing second representations which match the concepts, and output means responsive to the retrieval means and the memory for outputting identifications of the selected documents.

9. The system according to claim 8 wherein the processor means includes means for identifying if the difference between the maximum and minimum probable frequencies is within a preselected limit, and further including adjusting means responsive to the processor means for adding additional documents from the collection to the sample of documents if the calculating difference between the maximum and minimum probable frequencies exceeds the preselected limit.

10. The system according to claim 8 where the processor means calculates the maximum probable frequency, $f_{max}$, and the minimum probable frequency, $f_{min}$, in accordance with relationships based on the number of gaps between documents in the sample containing the second selected representation ($n_i$), the number of documents in the collection ($n_c$), and the number of documents in the sample ($x_i$).

11. The system according to claim 10 where $f_{max}$ and $f_{min}$ are calculated accordance with the relationships $$f_{max} = n_i + \frac{n_i(n_c - x_i)}{x_i - zs_i\sqrt{n_i}} + z\sqrt{\frac{n_i(n_c - x_i)}{x_i}}$$

and $$f_{min} = n_i + \frac{n_i(n_c - x_i)}{x_i + zs_i\sqrt{n_i}} - z\sqrt{\frac{n_i(n_c - x_i)}{x_i}}$$

where $s_i$ is the greater of $x_i/n_i$ or the standard deviation of the $n_i$ gaps, and z is the standard critical value for normal distribution for a preselected reliability.

12. In a system for identifying documents matching a query, in which the system has a database containing identifications of documents in a document collection and defining a plurality of representations representing the contents of the documents, the collection compromising a plurality of documents and the database containing a frequency of occurrence of documents containing each of at least some of the representations in the collection of documents, query means for defining a query containing a plurality of concepts, matching means for matching concepts to representations means for selecting documents meeting the query based on frequencies of occurrence of documents in the collection containing representations matching the concepts, and output means responsive to the means for selecting documents for outputting identifications of selected documents, the improvement comprising a process of estimating the frequency of occurrence of documents containing a representation in the collection of documents for which the database does not contain a frequency of occurrence, comprising:

identifying, on the basis of concepts in the query, a representation for which the database does not contain a frequency of occurrence;

selecting a sample comprising a plurality of documents from the collection, the sample containing fewer documents than the entire collection;

identifying the frequency of occurrence of documents containing the identified representation in the selected sample of documents;

calculating a maximum and a minimum probable frequency of occurrence of documents containing the identified representation in the collection; and selecting a midpoint of the maximum and minimum probable frequencies as the estimated frequency of occurrence of documents containing the identified representation, whereby the means for selecting documents meeting the query is responsive to the frequencies of occurrence in the database of documents in the collection containing representations matching the concepts and to estimated frequencies of occurrence to select documents in the collection containing representations matching the concepts.

13. The process according to claim 12 further including identifying whether the difference between the maximum and minimum probable frequencies is within a preselected limit, and adding additional documents to the sample from the collection if the calculated difference between the maximum and minimum probable frequencies exceeds the preselected limit.

14. The process according to claim 13 where the preselected limit is 0.05.

15. The process according to claim 12 where the maximum probable frequency, $f_{max}$, and the minimum probable frequency, $f_{min}$, are calculated in accordance with the relationships $$f_{max} = n_i + \frac{n_i(n_c - x_i)}{x_i - zs_i\sqrt{n_i}} + z\sqrt{\frac{n_i(n_c - x_i)}{x_i}}$$

and $$f_{min} = n_i + \frac{n_i(n_c - x_i)}{x_i + zs_i\sqrt{n_i}} - z\sqrt{\frac{n_i(n_c - x_i)}{x_i}}$$

where $n_i$ is the number of gaps between documents in the sample containing the selected representation, $n_c$ is the number of documents in the collection, $x_i$ is the number of documents in the sample, $s_i$ is the greater of $x_i/n_i$ or the standard deviation of the $n_i$ gaps, and z is the standard critical value for normal distribution for a preselected reliability.

16. The process according to claim 15 where the selected representation contains a plurality of terms, the method including setting $f_{min}$ equal to $n_i$ if the calculated $f_{min}$ is smaller than $n_i$, setting $f_{max}$ equal to $n_i+(n_c 31\ x_i)$ if the calculated $f_{max}$ is smaller than zero or smaller than $n_i$, and setting $f_{max}$ equal to an a priori maximum if the calculated $f_{max}$ is greater than the a priori maximum.

17. The process according to claim 16 wherein the selected representation is a synonym represented by a plurality of terms, and wherein the a priori maximum is equal to the sum of all frequencies of occurrence of documents in the collection containing a term of the synonym, said method including setting $f_{min}$ equal to an a priori minimum if the calculated $f_{min}$ is smaller than the a priori minimum, where the a priori minimum is equal to the frequency of occurrence of documents containing the term of the synonym appearing in the greatest number of documents in the collection.

18. The process according to claim 16 wherein the selected representation is a phrase containing a plurality of terms, and the a priori maximum is equal to the frequency of occurrence of documents containing the term of the phrase appearing in the least number of documents in the collection.

19. The process according to claim 15 where the preselected reliability is 0.995 and z is 2.8070.

20. The process according to claim 12 wherein the midpoint selected between the maximum and minimum probable frequencies is the mean of the maximum and minimum probable frequencies.

21. In a computer system for identifying documents matching a query, in which the system has a database containing identifications of documents in a document collection and defining a plurality of representations representing the contents of the documents, the collection comprising a plurality of documents, and query means for defining a query containing a plurality of concepts, apparatus for identifying documents of the document collection containing representations that match the query containing a plurality of concepts, the apparatus comprising:

processing means for calculating probabilities that documents match the query and for identifying a first document having a calculated probability;

threshold setting means responsive to the processing means for setting a probability threshold equal to the probability of the first document;

estimating means responsive to the processing means for estimating a maximum probability for a second document different from the first document based on a partially calculated probability and an assumption that the representations in the second document match the concepts of the query for which probabilities have not been calculated;

the processing means being responsive to the estimating means to calculate partial probabilities that representations in the second document match concepts of the query until either the estimated maximum probability for the second document does not at least equal the probability threshold or the probability is calculated for all the concepts in the query;

the estimating means being further responsive to the processing means ceasing or completing the calculation of the probability for the second document to estimate a maximum probability for a third document different from the first and second documents; and output means responsive to the processing means for outputting identifications of only documents whose probability is calculated for all concepts in the query.

22. The apparatus according to claim 21 wherein the output means includes a result list identifying in probability order, up to a predetermined number of documents whose probability is calculated for all concepts in the query, the threshold setting means being responsive to the result list to reset the probability threshold equal to the probability of the document lowest on the result list.

23. Apparatus according to claim 21 wherein the threshold setting means is responsive to the processing means calculating the probability for the second document for all the concepts in the query to set the probability threshold equal to the probability of the second document.

24. The apparatus according to claim 21 wherein the output means includes a result list identifying in probability order, up to a predetermined number of documents whose probability is calculated for all concepts in the query.

25. A document identification system for identifying a predetermined number of documents matching a query, comprising:

a read-only memory containing a database containing identifications of documents in a document collection and defining a plurality of representations representing the contents of documents in the document collection, the collection comprising a plurality of documents;

query means for defining the query containing a plurality of concepts;

computer means responsive to the query containing a plurality of concepts, the computer means including matching means for matching the concepts to representations;

sample selection means for iteratively selecting successive samples of a plurality of documents from the collection for examination, each sample containing fewer documents than the entire collection, and each successive sample containing documents different from each previous sample;

processing means responsive to the sample selection means for calculating, during each iteration probabilities that documents contained in the sample contain representations that match the query and for identifying up to a preselected number of documents having the highest probabilities, the documents being identified during each iteration from a group consisting of the respective sample of documents and the documents identified during the next previous iteration, the preselected number being different for each iteration and no greater than the predetermined number; and output means outputting identifications of the predetermined number of documents identified by the processing means.

26. The system according to claim 25 further including threshold setting means responsive to the processing means for setting a probability threshold equal to the probability of a first identified document.

27. The system according to claim 26 including determining means operable during each respective iteration and responsive to the identification of the preselected number of documents by the processing means to determine if an additional document of the respective sample has a probability grater than the probability threshold, the processing means being responsive to the determining means identifying an additional document having a probability greater than the probability threshold to replace the previously-identified document having the lowest probability with the additional document, and the threshold setting means is responsive to the processing means to reset the probability threshold to the probability of the identified document having the new lowest probability.

28. The system according to claim 25 including estimating means responsive to the processing means for estimating a maximum probability for a second document different from the first document based on a partially calculated probability for the second document and an assumption that the representations in the second document match the concepts of the query for which probabilities have not been calculated, the processing means being responsive to the estimating means to calculate partial probabilities that representations in the second document match concepts of the query until either the estimated maximum probability for the second document does not at least equal the threshold or the probability is calculated for all the concepts in the query.

29. The system according to claim 28 wherein the output means includes a result list ranking the identified documents in probability order, the threshold setting means being responsive to the result list to reset the probability threshold equal to the probability of the document lowest on the result list.

30. The system according to claim 25 wherein the output means includes a result list ranking the identified documents in probability order.

31. A document identification system for identifying documents matching a query, comprising:

a read-only memory containing a database containing identifications of documents in a document collection and defining a plurality of representations representing the contents of documents in a document collection, the collection comprising a plurality of documents, the database further containing indications of the frequencies of occurrences of a plurality of representations in the documents;

query means for defining the query containing a plurality of concepts;

computer means responsive to the query, the computer means including matching means for matching the concepts to representations;

calculating means for calculating the probabilities that documents meet the query based on the frequencies of occurrence of representations in the respective documents which match the concepts;

processing means responsive to the calculating means for identifying a first document contained in the sample having the highest calculated probability;

threshold setting means responsive to the processing means for setting a probability threshold equal to the probability of the first document;

estimating means responsive to the calculating means for estimating a maximum probability for a second document different from the first document based on a partially calculated probability for the second document and an assumption that the representations in the second document match the concepts of the query for which probabilities have not been calculated, said calculating means being responsive to the estimating means to calculate partial probabilities that representations in the second document match concepts in the query until either the estimated maximum probability for the second document does not at least equal the probability threshold or the probability is calculated for all concepts in the query, the estimating means being further responsive to the calculating means ceasing or the completing the calculation of the probability for the second document to estimate a maximum probability for a third document different from the first and second documents; and output means responsive to the processing means for outputting identifications of only documents whose probability is calculated for all concepts in the query.

32. The document identification system according to claim 31 wherein said output means includes a result list responsive to the calculating means to identify in probability order up to a predetermined number of those documents whose probability is calculated for all concepts in the query, said threshold setting means being responsive to the result list to reset the probability threshold equal to the probability of the document lowest on the result list.

33. In a computer system for identifying documents matching a query, in which the system has a database containing identifications of documents in a document collection and defining a plurality of representations representing the contents of the documents, the collection comprising a plurality of documents, and query means for defining a query containing a plurality of concepts, a process of identifying a predetermined number of documents of the document collection containing representations that have high probabilities of matching the query containing a plurality of concepts, the process comprising:

iteratively selecting successive samples of a plurality of documents from the collection for examination, each sample containing fewer documents than the entire collection, and each successive sample containing documents different from each previous sample;

calculating the probabilities that documents contained in the sample contain representations that match the query;

identifying, during each iteration, a preselected number of documents having the highest probabilities, the documents being selected from a group consisting of a respective sample of documents and the documents identified during the next previous iteration, the preselected number being different for each iteration and no greater than the predetermined number; and outputting identifications of the predetermined number of identified documents upon completion of the last iteration.

34. The process according to claim 33 including setting a probability threshold to the probability of the identified document having the lowest probability of all identified documents, and during each respective iteration and after the preselected number of documents has been identified, determining if an additional document of the respective sample has been identified having a probability greater than the probability threshold, and if so, replacing the previously-identified document having the lowest probability with the additional document and resetting the probability threshold to the probability of the identified document having the new lowest probability.

35. The process according to claim 33 wherein the preselected number is equal to the number of the respective iteration, and the predetermined number is equal to the number of the last iteration.

36. The process according to claim 33 including setting a probability threshold equal to the probability of a first document, estimating a maximum probability for a second document different from the first document based on a partially calculated probability for the second document and an assumption that the representations in the second document match the concepts of the query for which probabilities have not been calculated, and calculating partial probabilities that representations in the second document match concepts in the query until either the estimated maximum probability for the second document does not at least equal the threshold or the probability is calculated for all the concepts in the query.

37. The process according to claim 36 including ranking the identified documents in probability order, and resetting the probability threshold equal to the probability of the document lowest on the list.

38. The process according to claim 33 including ranking the identified documents in probability order.

39. In a computer system for identifying documents matching a query, in which the system has a database containing identifications of documents in a document collection and defining a plurality of representations representing the contents of the documents, the collection comprising a plurality of documents, and query means for defining a query containing a plurality of concepts, a process of identifying documents of the document collection containing representations that match the query containing a plurality of concepts, the process comprising:

computing the full probability that a first document matches the concepts in the query;

setting a probability threshold equal to the full probability of the first document;

calculating a partial probability that a second document matches some but not all concepts in the query;

estimating a maximum probability for the second document based on the calculated probability and an assumption that the representations in the document match the concepts of the query for which probabilities have not been calculated;

repeating the steps of calculating and estimating for additional query concepts until either the estimated maximum probability tier the second document is not as large as the probability threshold or the full probability of the second document is calculated for all concepts in the query;

repeating the repetitive steps of calculating and estimating for a third document different from the first and second documents; and outputting identifications of only documents having a full probability at least as great as the probability threshold.

40. The process according to claim 39 wherein a predetermined number of documents of the document collection is identified and wherein documents whose probabilities are calculated for all concepts in the query are identified to a result list in probability order, up to said predetermined number, said process further including resetting the probability threshold equal to the probability of the document lowest on the result list.

41. In a system identifying a predetermined number of documents matching a query, in which the system has a database containing identifications of documents in a document collection and defining a plurality of representations representing the contents of the documents, the collection comprising a plurality of documents, query means for defining containing a plurality of concepts, means for determining a probability that a document meets the query based on matches of representations in the document and concepts in the query, and output means for outputting the identifications of documents having a probability at least as great as a probability threshold, apparatus for establishing the probability threshold comprising:

sample selection means for iteratively selecting successive samples of a plurality of documents from the collection for examination, each sample containing fewer documents than the entire collection and each successive sample containing documents different from each previous sample;

calculating means for calculating probabilities that documents contained in the sample contain representations that match the query;

processing means responsive to the sample selection means to identify, during each iteration, up to a preselected number of documents having the highest probabilities, the documents being identified during each iteration from a group consisting of a respective sample of documents end the documents identified during the previous iteration; and threshold setting means responsive to the processing means for setting the probability threshold to the probability of the identified document having the lowest probability.

42. The apparatus according to claim 41 including determining means operable during each respective iteration and responsive to the identification of the preselected number of documents by the processing means to determine if the processing means identifies an additional document of the respective sample having a probability greater than the probability threshold, the processing means being responsive to the determining means to replace the previously-identified document having the lowest probability by the additional document, and the threshold setting means is responsive to the processing means to reset the probability threshold to the probability of the identified document having the new lowest probability.

43. The apparatus according to claim 41 wherein the preselected number is equal to the number of the respective iteration.

44. In a system for identifying a predetermined number of documents matching a query, in which the system has a database containing identifications of documents in a document collection and defining a plurality of representations representing the contents of the documents, the collection comprising a plurality of documents, query means for defining a query containing a plurality of concepts, means for determining a probability that a document meets the query based on a match of representations in the document and concepts in the query, and output means for outputting the identifications of documents having a probability at least as great as a probability threshold, a process for establishing the probability threshold comprising:

iteratively selecting successive samples of a plurality of documents from the collection for examination, each sample containing fewer documents than the entire collection, and each successive sample containing documents different from each previous sample;

calculating probabilities that documents in the sample contain representations that match the query;

identifying, during each iteration, up to a preselected number of documents having the highest probabilities, the documents being identified during each iteration from a group consisting of a respective sample of documents and the documents identified during the next previous iteration; and setting the probability threshold to the probability of the identified document having the lowest probability.

45. The process according to claim 44 including during each respective iteration and after the preselected number of documents has been identified, determining if an additional document of the sample has been identified having a probability greater than the probability threshold, replacing the previously-identified document having the lowest probability by the additional document, and resetting the probability threshold to the probability of the identified document having the new lowest probability.

46. The process according to claim 44 wherein the preselected number is equal to the number of the respective iteration.

UNITED STATES PATENT AND TRADEMARK OFFICE
CERTIFICATE OF CORRECTION

PATENT NO. : 5,488,725
DATED : January 30, 1996
INVENTOR(S) : HOWARD R. TURTLE, GERALD J. MORTON, F. KINLEY LARNTZ It is certified that error appears in the above-indentified patent and that said Letters Patent is hereby corrected as shown below:

After "References Cited U.S. PATENT DOCUMENTS", insert -- 4,241,402  12/1980  Mayper, Jr. et al.  364/200; 4,270,182  05/1981  Asija  364/900; 4,358,824  11/1982  Glickman et al.  364/200; 4,471,459  09/1984  Dickinson et al.  364/900; 4,499,553  02/1985  Dickinson et al.  364/900; 4,580,218  04/1986  Raye  364/300; 4,670,848  06/1987  Schramm  364/513; 4,688,195  08/1987  Thompson et al.  364/513; 4,706,212  11/1987  Toma  364/900; 4,787,035  11/1988  Bourne  364/300; 4,823,306  04/1989  Barbic et al.  364/900; 4,839,853  06/1989  Deerwester et al.  364/900; 4,862,408  08/1989  Zamora  364/900; 4,868,750  09/1989  Kucera et al.  364/419; 4,914,590  04/1990  Loatman et al.  364/419; 4,918,588  04/1990  Barrett et al.  364/200; 4,931,935  06/1990  Ohira et al.  364/419; 4,972,349  11/1990  Kleinberger  364/900; 4,974,191  11/1990  Amirghodsi et al.  364/900; 4,991,087  02/1991  Burkowski et al.  364/900; 5,099,425  03/1992  Kanno:Yuji et al.  364/419; 5,117,349  05/1992  Tirfing et al.  395/600 --

UNITED STATES PATENT AND TRADEMARK OFFICE
CERTIFICATE OF CORRECTION

PATENT NO. : 5,488,725
DATED : January 30, 1996
INVENTOR(S) : HOWARD R. TURTLE, GERALD J. MORTON, F. KINLEY LARNTZ It is certified that error appears in the above-indentified patent and that said Letters Patent is hereby corrected as shown below:

After "References Cited Other Publications" delete "Porter, An Algorithm for Suffix Skipping", Program, vol. 15, pp. 130-137 (1980).", insert -- Porter, "An Algorithm for Suffix Skipping", Program, vol. 14, pp. 130-137 (1980).--

Col. 25, line 39, delete "optomization", insert --Optomization--

Col. 29, line 47, after "plurality", delete "_"

Col. 29, line 49, after "plurality", delete "_"

Col. 30, line 48, before "comprising", insert --query--

Col. 31, line 33, delete "calculating", insert --calculated--

Col. 31, line 63, delete "compromising", insert --comprising--

Col. 34, line 61, delete "grater", insert --greater--

Col. 38, line 13, delete "end", insert --and--

Signed and Sealed this

Twenty-eighth Day of May, 1996

Attest:

BRUCE LEHMAN

Attesting Officer        Commissioner of Patents and Trademarks